United States Patent
Katsavounidis et al.

(10) Patent No.: US 10,742,708 B2
(45) Date of Patent: *Aug. 11, 2020

(54) ITERATIVE TECHNIQUES FOR GENERATING MULTIPLE ENCODED VERSIONS OF A MEDIA TITLE

(71) Applicant: NETFLIX, INC., Los Gatos, CA (US)

(72) Inventors: Ioannis Katsavounidis, San Jose, CA (US); Anne Aaron, Menlo Park, CA (US); Jan De Cock, Cupertino, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/016,432

(22) Filed: Jun. 22, 2018

(65) Prior Publication Data

US 2018/0302456 A1     Oct. 18, 2018

Related U.S. Application Data

(63) Continuation-in-part of application No. 15/902,976, filed on Feb. 22, 2018.

(Continued)

(51) Int. Cl.
*H04L 29/06* (2006.01)
*H04N 19/146* (2014.01)
(Continued)

(52) U.S. Cl.
CPC ........ *H04L 65/607* (2013.01); *H04L 65/4069* (2013.01); *H04L 65/4084* (2013.01);
(Continued)

(58) Field of Classification Search
CPC .......... H03M 13/2957; H03M 13/258; H03M 13/1102; H03M 13/2963; H03M 7/3068;
(Continued)

(56) References Cited

U.S. PATENT DOCUMENTS 5,612,742 A    3/1997 Krause et al.
7,394,410 B1   7/2008 Wegener
(Continued)

FOREIGN PATENT DOCUMENTS

EP        2 410 749 A1    1/2012

OTHER PUBLICATIONS

International Search Report for application No. PCT/US2018/042338 dated Oct. 29, 2018.
(Continued)

*Primary Examiner* — Dave Czekaj
*Assistant Examiner* — Kehinde Abimbola
(74) *Attorney, Agent, or Firm* — Artegis Law Group, LLP

(57) ABSTRACT

In various embodiments, an iterative encoding application generates shot encode points based on a first set of encoding points and a first shot sequence associated with a media title. The iterative encoding application performs convex hull operations across the shot encode points to generate a first convex hull. Subsequently, the iterative encoding application generates encoded media sequences based on the first convex hull and a second convex hull that is associated with both a second shot sequence associated with the media title and a second set of encoding points. The iterative encoding application determines a first optimized encoded media and a second optimized encoded media sequence from the encoded media sequences based on, respectively, a first target metric value and a second target metric value for a media metric. Portions of the optimized encoded media sequences are subsequently streamed to endpoint devices during playback of the media title.

20 Claims, 11 Drawing Sheets

Related U.S. Application Data

(60) Provisional application No. 62/550,517, filed on Aug. 25, 2017, provisional application No. 62/534,170, filed on Jul. 18, 2017, provisional application No. 62/462,873, filed on Feb. 23, 2017.

(51) Int. Cl.
*H04N 19/179* (2014.01)
*H04N 19/132* (2014.01)
*H04N 19/124* (2014.01)
*H04N 19/147* (2014.01)
*H04N 19/115* (2014.01)

(52) U.S. Cl.
CPC ......... *H04L 65/605* (2013.01); *H04N 19/115* (2014.11); *H04N 19/124* (2014.11); *H04N 19/132* (2014.11); *H04N 19/146* (2014.11); *H04N 19/147* (2014.11); *H04N 19/179* (2014.11)

(58) Field of Classification Search
CPC ...... H03M 7/3079; H03M 7/70; H03M 13/23; H03M 13/256; H03M 13/353; H03M 13/2918; H03M 13/2927; H03M 13/451; H03M 13/1108
See application file for complete search history.

(56) References Cited

U.S. PATENT DOCUMENTS

| | | | |
|---|---|---|---|
| 8,837,601 B2* | 9/2014 | Ronca | H04N 19/124 375/240.16 |
| 9,398,301 B2* | 7/2016 | Ronca | H04N 19/124 |
| 9,584,700 B2* | 2/2017 | Morovic | |
| 10,074,382 B2 | 9/2018 | Hoerich et al. | |
| 2002/0116715 A1 | 8/2002 | Apostolopoulos | |
| 2004/0161158 A1 | 8/2004 | Kondo et al. | |
| 2005/0031219 A1 | 2/2005 | Puri et al. | |
| 2007/0047639 A1 | 3/2007 | Ye | |
| 2008/0043832 A1 | 2/2008 | Barkley et al. | |
| 2008/0232466 A1 | 9/2008 | Faerber et al. | |
| 2009/0295905 A1 | 12/2009 | Civanlar et al. | |
| 2010/0189183 A1 | 9/2010 | Gu et al. | |
| 2011/0052087 A1* | 3/2011 | Mukherjee | H04N 19/46 382/248 |
| 2011/0075734 A1 | 3/2011 | Sakazume | |
| 2012/0147958 A1* | 6/2012 | Ronca | H04N 19/124 375/240.16 |
| 2012/0195369 A1 | 8/2012 | Guerrero | |
| 2013/0089154 A1 | 4/2013 | Chen et al. | |
| 2013/0329781 A1 | 12/2013 | Su et al. | |
| 2014/0040498 A1 | 2/2014 | Oyman et al. | |
| 2014/0201324 A1 | 7/2014 | Zhang et al. | |
| 2014/0241418 A1 | 8/2014 | Garbas et al. | |
| 2014/0294362 A1 | 10/2014 | Pettersson et al. | |
| 2015/0071346 A1* | 3/2015 | Ronca | H04N 19/124 375/240.03 |
| 2015/0127337 A1* | 5/2015 | Heigold | G10L 15/063 704/232 |
| 2015/0370796 A1 | 12/2015 | Abramson et al. | |
| 2016/0212433 A1 | 7/2016 | Zhu et al. | |
| 2016/0379057 A1 | 12/2016 | Katsavounidis | |
| 2017/0078686 A1 | 3/2017 | Coward et al. | |
| 2017/0186147 A1 | 6/2017 | He et al. | |
| 2018/0007355 A1 | 1/2018 | Borel et al. | |
| 2018/0063549 A1 | 3/2018 | Amer et al. | |
| 2018/0160161 A1 | 6/2018 | Reznik et al. | |
| 2018/0240502 A1 | 8/2018 | Katsavounidis | |
| 2018/0241795 A1 | 8/2018 | Katsavounidis | |
| 2018/0242002 A1 | 8/2018 | Katsavounidis | |
| 2018/0242015 A1 | 8/2018 | Katsavounidis | |
| 2018/0343458 A1 | 11/2018 | Katsavounidis et al. | |
| 2019/0028529 A1 | 1/2019 | Katsavounidis | |
| 2019/0028745 A1 | 1/2019 | Katsavounidis | |

OTHER PUBLICATIONS

T. Wiegand, G. J. Sullivan, G. Bjøntegaard, and A. Luthra, "Overview of the H.264/AVC Video Coding Standard," Circuits and Systems for Video Technology, IEEE Transactions on, vol. 13, No. 7, Jul. 2003, pp. 560-576, 2003.

L. Zhao, I. Katsavounidis, and C.-C. J. Kuo, "Another example of software replacing hardware: Real-time software MPEG-2 SDI/HD encoding for digital tv broadcasting," in NAB Broadcast Engineering Conference, 2003, pp. 37-40.

"The NETFLIX tech blog: High quality video encoding at scale," link: http://techblog.netflix.com/2015/12/high-quality-video-encoding-at-scale.html.

A. Ortega and K. Ramchandran, "Rate-distortion methods for image and video compression: An overview," IEEE Signal Processing Magazine, vol. 15, No. 6, pp. 23-50, 1998.

I. E. Richardson, H. 264 and MPEG-4 video compression: video coding for next-generation multimedia. John Wiley & Sons, 2004.

R. G. Keys, "Cubic convolution interpolation for digital image processing," IEEE Trans. on Acoustics, Speech, and Signal Processing, vol. ASSP-29, No. 6, pp. 1153-1160, 1981.

"Lanczos resampling," link: http://en.wikipedia.org/wiki/Lanczos resampling.

"The NETFLIX tech blog: Per-Title Encode Optimization," link: http://techblog.netflix.com/2015/12/per-title-encode-optimization.html.

I. Katsavounidis, A. Aaron, and D. Ronca, "Native resolution detection of video sequences," in SMPTE 2015 Annual Technical Conference and Exhibition. SMPTE, 2015, pp. 1-20.

"The NETFLIX tech blog: Toward a practical perceptual video quality metric," link: http://techblog.netflix.com/2016/06/toward-practical-perceptual-video.html.

"x264," link: https://en.wikipedia.org/wiki/X264, Mar. 2016.

S. Tavakoli, K. Brunnstrom, J. Gutierrez, and N. Garcia, "Quality of experience of adaptive video streaming: Investigation in service parameters and subjective quality assessment methodology," Signal Processing: Image Communication, vol. 39, pp. 432-443, 2015.

"Consumer Digital Video Library—El Fuente," link: http://www.cdvl.org/documents/ElFuente_summary.pdf.

G. J. Sullivan and T. Wiegand, "Rate-distortion optimization for video compression," IEEE signal processing magazine, vol. 15, No. 6, pp. 74-90, 1998.

T. Thiede, W. C. Treurniet, R. Bitto, C. Schmidmer, T. Sporer, J. G. Beerends, and C. Colomes, "Peaq-the ITU standard for objective measurement of perceived audio quality," Journal of the Audio Engineering Society, vol. 48, No. 1/2, pp. 3-29, 2000.

"Consumer Digital Video Library," link: http://www.cdvl.org.

International Search Report for application No. PCT/US2018/019575 dated Apr. 9, 2018.

International Search Report for application No. PCT/US2018/019576 dated May 4, 2018.

Westerink et al., "An Optimal Bit Allocation Algorithm for Sub-Band Coding", ICASSP-88., International Conference on Acoustics, Speech, and Signal Processing, Apr. 11-14, 1988, pp. 757-760.

Riskin, Eve A., "Optimal Bit Allocation via the Generalized BFOS Algorithm", IEEE Transactions on Information Theory, Mar. 1, 1991, vol. 37, No. 2, pp. 400-402.

Yu et al., "Efficient Rate Control for JPEG-2000", IEEE Transactions on Circuits and Systems for Video Technology, May 1, 2006, vol. 16, No. 5, pp. 577-589.

Wu et al., "Rate-Constrained Picture-Adaptive Quantization for JPEG Baseline Coders", IEEE International Conference on Acoustics, Speech, and Signal Processing, Apr. 27-30, 1993, pp. 389-392.

Sermadevi et al., "Efficient Bit Allocation for Dependent Video Coding", DCC '04 Proceedings of the Conference on Data Compression, Mar. 23, 2004, 6 pages.

Ramchandran et al., "Bit Allocation for Dependent Quantization with Applications to Multiresolution and MPEG Video Coders", IEEE Transactions on Image Processing, Sep. 1994, vol. 3, No. 5, pp. 533-545.

(56) References Cited

OTHER PUBLICATIONS

Ortega et al., "Rate-Distortion Methods for Image and Video Compression", IEEE Signal Processing Magazine, Nov. 1998, vol. 15, No. 6, pp. 23-50.
Non-Final Office Action received for U.S. Appl. No. 15/902,970 dated Apr. 5, 2019, 59 pages.
Final Office Action received for U.S. Appl. No. 15/902,970 dated Oct. 31, 2019, 41 pages.
Non-Final Office Action received for U.S. Appl. No. 15/902,971 dated Oct. 31, 2019, 50 pages.
Non-Final Office Action received for U.S. Appl. No. 15/902,975 dated Aug. 22, 2019, 34 pages.
Non-Final Office Action received for U.S. Appl. No. 16/053,754 dated Aug. 21, 2019, 27 pages.
Non-Final Office Action received for U.S. Appl. No. 16/034,303 dated Jul. 10, 2019, 27 pages.
Non-Final Office Action received for U.S. Appl. No. 15/902,976 dated Jan. 2, 2020, 36 pages.
Notice of Allowance received for U.S. Appl. No. 16/034,303 dated Jan. 14, 2020, 24 pages.
Advisory Action received for U.S. Appl. No. 15/902,970 dated Feb. 10, 2020, 13 pages.
Final Office Action received for U.S. Appl. No. 15/902,971 dated Feb. 20, 2020, 50 pages.
Non-Final Office Action received for U.S. Appl. No. 16/054,621 dated Mar. 5, 2020, 40 pages.
Final Office Action received for U.S. Appl. No. 16/053,754 dated Mar. 18, 2020, 26 pages.
Notice of Allowance received for U.S. Appl. No. 15/902,975 dated Mar. 4, 2020, 28 pages.
Non-Final Office Action received for U.S. Appl. No. 15/902,970 dated Mar. 30, 2020, 51 pages.

\* cited by examiner

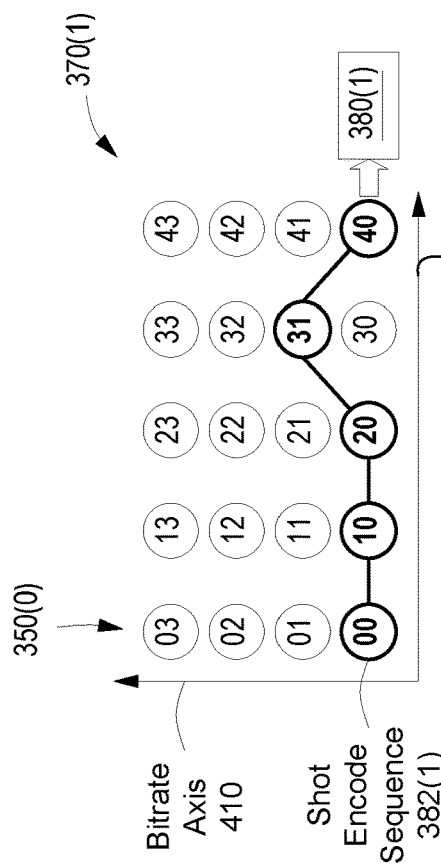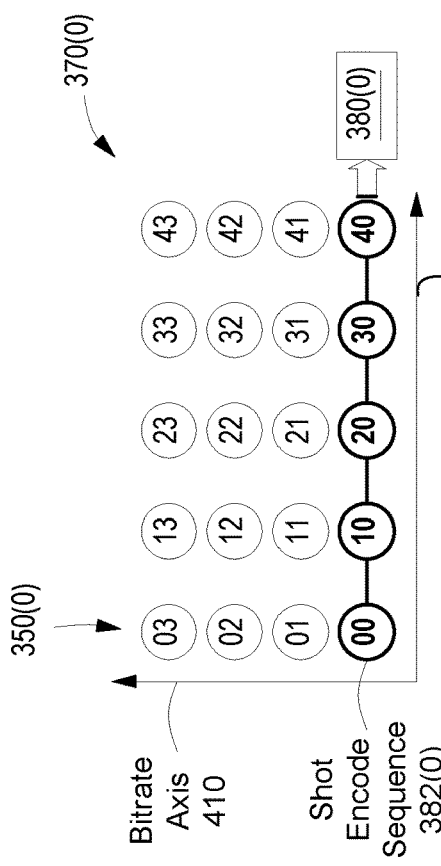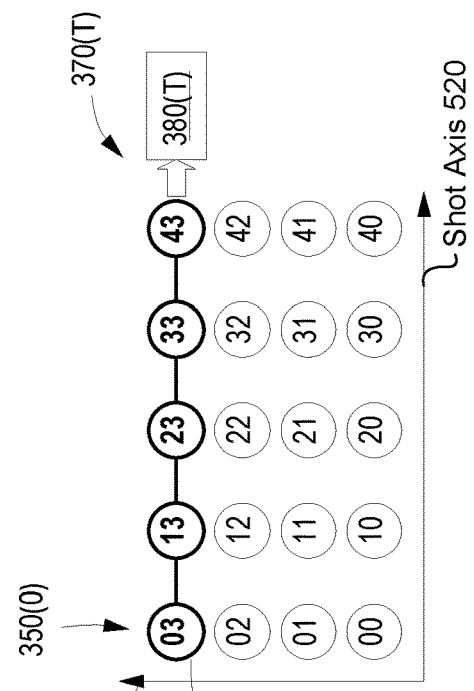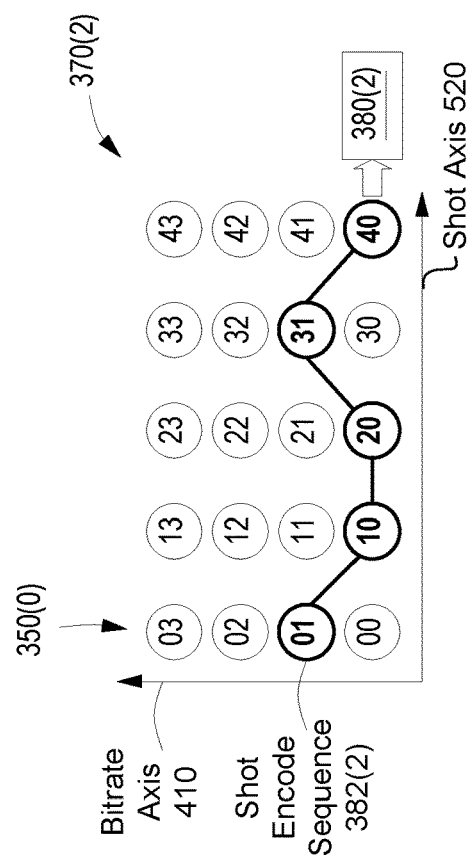

| Target Metric Value 142(0) = 560 bitrate in kbps | 640x360 shot sequence 132(0) encoded at QP = 26 | 640x360 shot sequence 132(1) encoded at QP = 26 | 640x360 shot sequence 132(2) encoded at QP = 51 | 640x360 shot sequence 132(3) encoded at QP = 26 | 640x360 shot sequence 132(4) encoded at QP = 51 | Target Encoded Video Sequence 180(0) |
|---|---|---|---|---|---|---|
| Target Metric Value 142(1) = 3000 bitrate in kbps | 960x540 shot sequence 132(0) encoded at QP = 40 | 640x360 shot sequence 132(1) encoded at QP = 11 | 1280x720 shot sequence 132(2) encoded at QP = 47 | 960x540 shot sequence 132(3) encoded at QP = 26 | 640x360 shot sequence 132(4) encoded at QP = 2 | Target Encoded Video Sequence 180(1) |
| Target Metric Value 142(2) = 5800 Bitrate in kbps | 960x540 shot sequence 132(0) encoded at QP = 15 | 640x360 shot sequence 132(1) encoded at QP = 7 | 1280x720 shot sequence 132(2) encoded at QP = 47 | 960x540 shot sequence 132(3) encoded at QP = 22 | 960x540 shot sequence 132(4) encoded at QP = 43 | Target Encoded Video Sequence 180(2) |

FIGURE 8

ITERATIVE TECHNIQUES FOR GENERATING MULTIPLE ENCODED VERSIONS OF A MEDIA TITLE

CROSS-REFERENCE TO RELATED APPLICATIONS

This application is a continuation-in-part of co-pending U.S. patent application titled, "ITERATIVE TECHNIQUES FOR ENCODING VIDEO CONTENT," filed on Feb. 22, 2018 and having Ser. No. 15/902,976, which claims the priority benefit of the U.S. Provisional Patent Application titled, "VIDEO ENCODING AT SCALE: PERCEPTUALLY OPTIMAL ENCODING OF VIDEO SEQUENCES," filed on Feb. 23, 2017 and having Ser. No. 62/462,873. This application also claims the priority benefit of the U.S. Provisional Patent Application titled, "ENCODING TECHNIQUE FOR OPTIMIZING DISTORTION AND BITRATE," filed on Jul. 18, 2017 and having Ser. No. 62/534,170 and U.S. Provisional Patent Application titled, "ENCODING TECHNIQUE FOR OPTIMIZING DISTORTION AND BITRATE," filed on Aug. 25, 2017 and having Ser. No. 62/550,517. The subject matter of these related applications is hereby incorporated herein by reference.

BACKGROUND

Field of the Various Embodiments

Embodiments of the present invention relate generally to video technology and, more specifically, to iterative techniques for generating multiple encoded versions of a media title.

Description of the Related Art

A typical video streaming service provides access to a library of media titles that can be viewed on a range of different endpoint devices. Each endpoint device may connect to the video streaming service under different connection conditions, such as bandwidth and latency. In addition, each different endpoint device may include different hardware for outputting the media title to end user(s). For example, a given endpoint device could include a display screen having a particular screen size and a particular screen resolution.

In many implementations, an endpoint device that connects to a video streaming service executes an endpoint application that determines, for a given media title, an appropriate encoded version of the media title to stream to the endpoint device based on the connection conditions and the properties of the endpoint device. More specifically, the endpoint application attempts to select a particular encoded version of the media title that provides the best possible visual quality during playback of the media title on the endpoint device while avoiding playback interruptions due to buffering or re-buffering.

In some implementations, the endpoint application selects the particular encoded version of the media title based on a bitrate ladder. The bitrate ladder is designed to achieve a target visual quality during playback of a media title based on an available bandwidth. Each rung in the bitrate ladder specifies a different bitrate-resolution pair corresponding to a different pre-generated encoded version of the media title. To generate the encoded version of a media title corresponding to a given bitrate-resolution pair, the video content associated with the media title is sampled at the resolution to generate sampled video content. One or more encoding parameter values are selected based on the bitrate and then used to encode the sampled video content.

One drawback of the above encoding technique is that the complexity of the video content associated with a given media title oftentimes varies across the media title; whereas, the resolution and the encoding parameter value(s) used to encode the video content do not vary. As a result, encoding relatively simple portions of the media title may consume more computational and storage resources than what is necessary to meet the target visual quality. For example, a relatively simple portion of a media title could have the same visual quality regardless of whether that portion of video content is encoded using a bitrate of 560 kilobits per second (kbps) or using a bitrate of 3000 kbps. Among other things, such encoding inefficiencies waste computational and storage resources and increase the bandwidth required to stream encoded versions of media titles to endpoint devices.

As the foregoing illustrates, what is needed in the art are more effective techniques for encoding a media title for streaming.

SUMMARY

One embodiment of the present invention sets forth a computer-implemented method for encoding a media title for streaming. The method includes generating a first set of shot encode points based on a first set of encoding points and a first shot sequence included in a source media sequence that is associated with a media title; performing convex hull operations across the first set of shot encode points to generate a first convex hull; generating a first plurality of encoded media sequences based on the first convex hull and a second convex hull that is associated with both a second shot sequence included in the source media sequence and a second set of encoding points; determining a first optimized encoded media sequence from the first plurality of encoded media sequences based on a first target metric value for a media metric, where at least a portion of the first optimized encoded media sequence is subsequently streamed to a first endpoint device during playback of the media title; and determining a second optimized encoded media sequence from the first plurality of encoded media sequences based on a second target metric value for the media metric, where at least a portion of the second optimized encoded media sequence is subsequently streamed to a second endpoint device during playback of the media title.

At least one technological improvement of the disclosed techniques relative to prior art is that, for each target metric value, generating an optimized encoded media sequence based on sets of individually encoded shot sequences reduces the encoding inefficiencies typically associated with conventional encoding techniques. If a given target metric value is a target bitrate, then encoding different shot sequences using different encoding points can increase the visual quality of the optimized encoded media sequence. By contrast, if a given target metric value is a target visual quality score, then encoding different shot sequences using different encoding points can reduce the bandwidth required to stream the optimized encoded media sequence to endpoint devices.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIGS. 5A-5D are more detailed illustrations of how the trellis iterator of FIG. 3 assembles encoded shot sequences into encoded video sequences, according to various embodiments of the present invention;

FIG. 8 illustrates exemplary target encoded video sequences that are generated by the iterative encoding application of FIG. 1, according to various embodiments of the present invention.

DETAILED DESCRIPTION

Figure 1:
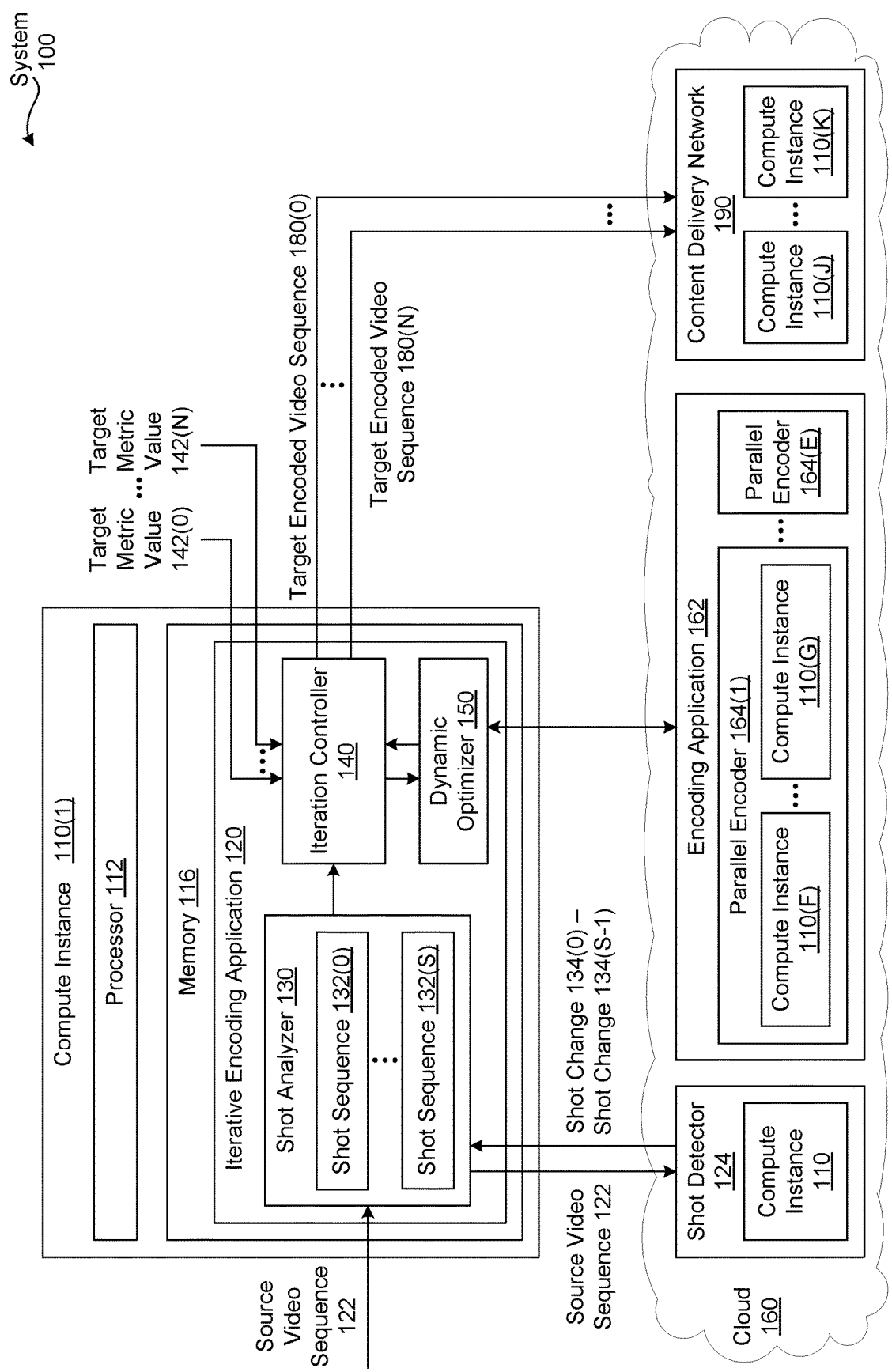
FIG. 1 is a conceptual illustration of a system configured to implement one or more aspects of the present invention.

In the following description, numerous specific details are set forth to provide a more thorough understanding of the various embodiments. However, it will be apparent to one of skilled in the art that the inventive concepts may be practiced without one or more of these specific details.

To optimize the overall visual experience that a video streaming service provides to viewers, the video streaming service provider oftentimes generates a bitrate ladder for each media title. The bitrate ladder for a given media title allows client-side endpoint devices to achieve a target visual quality during playback of the media title based on an available bandwidth. Each rung in the bitrate ladder specifies a different bitrate-resolution pair corresponding to a different pre-generated encoded version of the media title. The encoded version of the media title corresponding to a given bitrate-resolution pair is generated based on the resolution and one or more encoding parameter values associated with the bitrate.

However, the pre-generated versions of the media title are often associated with encoding inefficiencies. Namely, the complexity of the video content associated with a given media title oftentimes varies across the media title, but the resolution and encoding parameter value(s) used to encode the video content do not vary. As a result, encoding relatively simple portions of the media title may consume more computational and storage resources than are necessary to meet the target visual quality. Further, the bandwidth required to stream the encoded versions of the media title may be unnecessarily large.

For example, a movie could include relatively complex action portions and relatively simple monologues. The monologues could have the same visual quality regardless of whether the monologues are encoded using a bitrate of 3000 kilobits per second (kbps) or encoded using a bitrate of 560 kbps. By contrast, the required resources (e.g., computational resources, storage resources, bandwidth, etc.) associated with encoding the monologues using a bitrate of 3000 kbps exceed the required resources associated with encoding the monologues using a bitrate of 560 kbps. Accordingly, encoding the entire movie using a bitrate of 3000 kbps needlessly wastes computational and storage resources and unnecessarily increases the bandwidth required to stream the encoded version of the movie to endpoint devices.

With the disclosed techniques, however, a video streaming service provider can efficiently generate encoded versions of a given media title by varying the resolution and/or encoding parameter value(s) across the media title. First, the disclosed techniques partition the media title into different shot sequences, where each shot sequence includes video content captured continuously from a given camera or other capture point. For each of multiple target metric values (e.g., target bitrates, target quality scores, etc.), the disclosed techniques encode each shot sequence using a resolution and one or more encoding parameter value(s) that are optimized for the shot sequence and the target metric value. As a result, the disclosed techniques reduce the encoding inefficiencies typically associated with bitrate ladders.

In various embodiments, an iterative encoding application generates multiple encoded version of a media title, where each encoded version is associated with a different target metric value. The target metric values are values of any type of metric that corresponds to one or more properties of encoded video content. Examples of metrics include bitrate, visual quality, and the like. First, the iterative encoding application partitions a media title into different shot sequences. Subsequently, the iterative encoding application generates different encoded versions of each shot sequence based on shot-specific sets of encoding points. Each encoding point included in a shot-specific set of encoding points specifies a different combination of a resolution and an encoding parameter value. The iterative encoding application then performs optimization operations to determine a set of encoded video sequences, where each encoded video sequence includes a set of encoded shot sequences that span the length of the media title.

For each target metric value, the iterative encoding application selects the encoded video sequence having a metric value closest to the target metric value. The iterative encoding application then determines whether the selected encoded video sequence is optimized for the target metric value. If the iterative encoding application determines that the selected encoded video sequence is optimized for the target metric value, then the iterative encoding application assigns the selected encoded video sequence to the target metric value. Otherwise, the iterative encoding application generates additional shot-specific encoding points based on the "non-optimized" target metric value.

After evaluating each target metric value, if there are any additional shot-specific encoding points, then the iterative encoding application removes any duplicated additional shot-specific encoding points. Subsequently, the iterative encoding application generates new encoded shot sequences based on the additional shot-specific encoding points, regenerates the optimized encoded video sequences, and re-selects encoded video sequences for each non-optimized target metric value.

The iterative encoding application continues to operate in this fashion until the iterative encoding application has assigned a different encoded video sequence to each target metric. Advantageous, each of the encoded shot sequences included in a given encoded video sequence can be associated with a different encoding point. For example, an encoded video sequence could include a car chase shot sequence that is encoded using a resolution of 1280×720 and a first encoding parameter value followed by a monologue shot sequence that is encoded using a resolution of 960×540 and a second encoding parameter value.

One advantage and technological advancement of the disclosed techniques is that encoding different shot sequences included in a media title using different encoding points reduces the encoding inefficiencies typically associated with conventional encoding techniques. Notably, if the target metric value is a target bitrate, then optimizing the encoding point for each shot sequence based on the target metric value increases the visual quality of the corresponding encoded video sequence. If, however, the target metric value is a target visual quality score, then optimizing the encoding point for each shot sequence based on the target metric value reduces the bitrate required to stream the corresponding encoded video sequence to endpoint devices.

System Overview

FIG. 1 is a conceptual illustration of a system 100 configured to implement one or more aspects of the present invention. As shown, the system 100 includes, without limitation, any number of compute instances 110, and a cloud 160. In general, the cloud 160 contains encapsulated shared resources, software, data, etc. For explanatory purposes, multiple instances of like objects are denoted with reference numbers identifying the object and parenthetical numbers identifying the instance where needed.

Any number of the compute instances 110 may reside outside the cloud 160 while other compute instances 110 may reside inside the cloud 160. In various embodiments, any number of the components of the system 100 may be distributed across multiple geographic locations. Further, any number of the components of the system 100 may be included in or distributed across one or more stand-alone devices, distributed computing environments, or clouds 160 in any combination.

As shown, each of the compute instances 110 includes, without limitation, a processor 112 and a memory 116. The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. The memory 116 stores content, such as software applications and data, for use by the processor 112 of the compute instance 110.

The memory 116 may be one or more of a readily available memory, such as random access memory (RAM), read only memory (ROM), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

The compute instances 110 are configured to implement one or more applications. For explanatory purposes only, each application is depicted as residing in the memory 116 of a single compute instance 110 and executing on a processor 112 of the single compute instance 110. However, as persons skilled in the art will recognize, the functionality of each application may be distributed across any number of other applications that reside in the memories 116 of any number of compute instances 110 and execute on the processors 112 of any number of compute instances 110 in any combination. Further, the functionality of any number of applications may be consolidated into a single application or subsystem.

In particular, the compute instances 110 are configured to generate target encoded video sequences 180(0)-180(N) for the source video sequence 122. The source video sequence 122 includes, without limitation, any amount and type of video content that is associated with a media title. Examples of video content include, without limitation, any portion (including all) of feature length films, episodes of television programs, and music videos, to name a few. Each of the target encoded video sequences 180 is a different pre-generated encoded version of the media title and includes, without limitation, encoded video content derived from the video content included in the source video sequence 122

The target encoded video sequences 180(0)-180(N) are associated with, respectively, target metric values 142(0)-142(N). Each of the target metric values 142 is a different value for a media metric. The media metric may be any measurement that corresponds to one or more properties of encoded video content, video content, audio content, and/or encoded audio content. In some embodiments, the media metric is a bitrate. In alternate embodiments, the media metric is a visual quality metric. Example of visual quality metrics include, without limitation, a peak signal-to-noise-ratio PSNR), a linear video multimethod assessment fusion ((VMAF) metric, and a harmonic VMAF (VMAFh), to name a few.

Although not shown, the video streaming service provides access to a library of media titles that can be viewed on a range of different endpoint devices. The library of media titles includes without limitation, the media title associated with the source video sequence 122. Each endpoint device may connect to the video streaming service under different connection condition, such as bandwidth and latency. In addition, each different endpoint device may include different hardware for outputting the media title to end user(s). For example, a given endpoint device could include a display screen having a particular screen size and a particular screen resolution.

In many implementations, an endpoint device that connects to a video streaming service executes an endpoint application that determines, for a given media title, an appropriate encoded version of the media title to stream to the endpoint device based on the connection conditions and the properties of the endpoint device. More specifically, the endpoint application attempts to select a particular encoded version of the media title that provides the best possible visual quality during playback of the media title on the endpoint device while avoiding playback interruptions due to buffering or re-buffering.

In some conventional implementations, the endpoint application selects the particular encoded version of the media title based on a bitrate ladder, where each rung in the bitrate ladder is associated with a different bitrate-resolution pair. To generate the encoded version of a media title corresponding to a given bitrate-resolution pair, the video content associated with the media title is sampled at the resolution to generate sampled video content. One or more encoding parameter values are selected based on the bitrate and then used to encode the sampled video content.

One drawback of the above conventional encoding technique is that the complexity of the video content associated with a given media title oftentimes varies across the media title, but the resolution and the encoding parameter value(s) used to encode the video content do not vary across the media title. As a result, encoding relatively simple portions of the media title may consume more computational and storage resources than are necessary to meet the target visual quality. For example, a relatively simple portion of a media title could have the same visual quality regardless of whether that portion of video content is encoded using a bitrate of 560 kbps or encoded using a bitrate of 3000 kbps. Such encoding inefficiencies needlessly waste computational and storage resources and increase the bandwidth required to stream encoded versions of media titles to endpoint devices.

Optimizing Encoding Operations for Individual Shot Sequences

To address the above problems, the system 100 includes, without limitation, an iterative encoding application 120 that optimizes the resolution and encoding parameter value(s) for each shot sequence 132 included in the source video sequence 122 to generate the target encoded video sequences 180. The source video sequence 122 includes, without limitation, any number of contiguous and non-overlapping shot sequences 132. Each of the shot sequences 132 includes a set of frames that usually have similar spatial-temporal properties and run for an uninterrupted period of time. The iterative encoding application 120 resides in one of the memories 116 and executes on one of the processors 112.

As shown, the iterative encoding application 120 includes, without limitation, a shot analyzer 130, an iteration controller 140, and a dynamic optimizer 150. Upon receiving the source video sequence 122, the shot analyzer 130 identifies one or more shot changes 134 included in the source video sequence 122. Each of the shot changes 134 specifies a boundary between a different pair of the shot sequences 132. The shot analyzer 130 may identify the one or more shot changes 134 in any technically feasible fashion.

For instance, in some embodiments, the shot analyzer 130 transmits the source video sequence 122 to a shot detector 124 that resides in the cloud 160. To determine the shot changes 134, the shot detector 124 executes any number of shot detection algorithms based on the source video sequence 122. Some examples of shot detection algorithms include, without limitation, a multi-scale sum-of-absolute-differences algorithm, a motion-compensated residual energy algorithm, a histogram of differences algorithm, a difference of histograms algorithm, and so forth. The shot detector 124 then transmits the shot changes 134 to the shot analyzer 130. In alternate embodiments, the shot analyzer 130 may perform any number of shot detection operations on the source video sequence 122 to identify the shot changes 134.

The shot analyzer 130 performs partitioning operations on the source video sequence 122 based on the shot changes 134 to determine the shot sequences 132. In some embodiments, the shot analyzer 130 may also remove extraneous pixels from the source video sequence 122. For example, the shot analyzer 130 could remove pixels included in black bars along border sections of the source video sequence 122.

In various embodiments, the iterative encoding application 120 ensures that the initial frame of each shot sequence 132 is encoded as a key frame during encoding operations. As a general matter, a "key frame" and all subsequent frames from the same shot sequence 132 that are included in an encoded video sequence are decoded independently of any proceeding frames included the encoded video sequence. The iterative encoding application 120 may ensure that the different initial frames of the different shot sequences 132 are encoded as key frames in any technically feasible fashion. For instance, in some embodiments, the dynamic optimizer 150 configures an encoding application 162 to encode frames as key frames based on a key frame location list (not shown in FIG. 1) when encoding video content. In other embodiments, the dynamic optimizer 150 may perform any number of encoding operations to encode the different initial frames of the different shot sequences 132 as key frames when encoding video content.

As persons skilled in the art will recognize, during playback, the media title associated with the source video sequence 122 is switchable between decoded versions of different target encoded video sequences 180 at aligned key frames to optimize a viewing experience based on any number of relevant criteria. Examples of relevant criteria include the current connection bandwidth, the current connection latency, the content of the upcoming shot sequence 132, and the like.

For each of the target metric values 142(t), the iteration controller 140 generates the target encoded video sequence 180(t) based on the shot sequences 132 and the target metric value 142(t). Each of the target encoded video sequences 180 includes, without limitation, S+1 encoded shot sequences (not shown in FIG. 1) that are associated, respectively, with the shot sequences 132(0)-132(S). Each of the encoded shot sequences includes encoded video content derived from the video content included in the associated shot sequence 132.

In operation, the iteration controller 140 generates the target encoded video sequences 180 in an iterative process that optimizes each of the encoded shot sequences included in the target encoded video sequences 180. As described in greater detail in conjunction with FIGS. 2A-2B, for each shot sequence 132, the iteration controller 140 initializes a different encoding list (not shown in FIG. 1) to include relatively sparsely distributed encoding points. In general, a given encoding list may specify any number of encoding points and the number of encoding points in the encoding list may differ from the number of encoding points in other encoding lists. Each encoding point specifies a resolution and one or more encoding parameter values. As referred to herein, an encoding parameter value is a value for an encoding parameter.

Subsequently, as described in greater detail in conjunction with FIGS. 3-6, the iteration controller 140 configures the dynamic optimizer 150 to generate targeting data based on the encoding lists. First, the dynamic optimizer 150 evaluates the encoding lists to identify new encoding points. For each encoding list, a "new" encoding point is an encoding point for which the dynamic optimizer 150 has not previously generated an encoded shot sequence based on the associated shot sequence 132. For each new encoding point, the dynamic optimizer 150 generates an encoded shot sequence.

The dynamic optimizer 150 may generate the encoded shot sequences in any technically feasible fashion. Further, as a general matter, the dynamic optimizer 150 may generate encoded video content derived from video content based on a given resolution and given encoding parameter value(s) in any technically feasible fashion. For instance, in some embodiments, the dynamic optimizer 150 performs sampling operations on the video content based on the resolution to generate sampled video content. Subsequently, the dynamic optimizer 150 configures the encoding application 162 to encode the sampled video content using the encoding parameter value(s) to generate the encoded shot sequence.

As shown, the encoding application 162 resides in the cloud 160 and is configured to efficiently perform encoding operations via one or more parallel encoders 164. Each of the parallel encoders 164 may include any number of compute instances 110. In alternate embodiments, the dynamic optimizer 150 may perform encoding operations and the system 100 may omit the encoding application 162. In the same or other embodiments, the system 100 may include a sampling application, and the dynamic optimizer 150 may configure the sampling application to perform sampling operations.

The dynamic optimizer 150 may perform sampling operations and encoding operations at any level of granularity (e.g., per frame, per shot sequence 132, per source video sequence 122, etc.) in any combination and in any technically feasible fashion. For instance, in some embodiments, the dynamic optimizer 150 may perform sampling operations on the source video sequence 122 based on a given resolution to generate a sampled video sequence. Subsequently, for each encoding point associated with the resolution, the dynamic optimizer 150 may configure the encoding application 162 to encode the sampled video content corresponding to the associated shot sequence 132 using the associated encoding parameter value(s).

After generating a new encoded shot sequence, the dynamic optimizer 150 computes a bitrate, a quality score, and a distortion level based on the encoded shot sequence. The dynamic optimizer 150 may compute the bitrate, the quality score, and the distortion level in any technically feasible fashion. For each new encoded shot sequence, the dynamic optimizer 150 generates a shot encode point (not shown in FIG. 1) that includes, without limitation, the encoded shot sequence, the resolution, the encoding parameter value(s), the bitrate, the quality score, and the distortion level.

For each of the shot sequences 132(x), the dynamic optimizer 150 adds the new shot encode point(s) associated with the shot sequence 132(x), to a shot encode set associated with the shot sequence 132(x). For each of the shot sequences 132(x), the dynamic optimizer 150 generates a different convex hull based on the shot encode set associated with the shot sequence 132(x). In this fashion, the convex hull associated with a given shot sequence 132 includes any number of the shot encode points included in the associated shot encode set. In general, for a given shot sequence 132, the shot encode points included in the associated convex hull minimize the bitrate for different distortion levels.

The dynamic optimizer 150 then evaluates the convex hulls across all of the shot sequences 132 to determine shot encode sequences (not shown in FIG. 1). Each shot encode sequence specifies shot encode points for the different shot sequences 132. For each shot encode sequence, the dynamic optimizer 150 aggregates the different encoded shot sequences included in the shot encode points to generate an encoded video sequence. For each shot encode sequence, the dynamic optimizer 150 then generates a video encode point that includes the shot encode sequence, the associated encoded video sequence, an overall bitrate for the encoded shot sequence, and an overall distortion level for the encoded shot sequence. Subsequently, the dynamic optimizer 150 generates a global convex hull based on the video encode points. In general, for the source video sequence 122, each of the video encode points included in the global convex hull minimizes the overall bitrate for a different overall distortion level. Finally, the dynamic optimizer 150 provides targeting data to the iteration controller 140. The targeting data includes, without limitation, the shot encode sets, the convex hulls, the video encode points, and the global convex hull.

For each of the target metric values 142(t), a different instance of a target optimizer (not shown in FIG. 1) included in the iteration controller 140 independently processes the targeting data based on the target metric value 142(t). For the target metric value 142(t), the associated instance of the target optimizer selects an optimized video encode point that is included in the global convex hull based on the target metric value 142(t). For each shot sequence 132, the instance of the target optimizer identifies an optimized shot encode point based on the optimized video encode point. Subsequently, for each shot sequence 132, the instance of the target optimizer generates an encoding list update (not shown in FIG. 1). Each of the encoding list updates identifies any number (including zero) of additional encoding points based on the associated optimized shot encode point and the convex hull associated with the associated shot sequence 132. More specifically, for a given shot sequence 132, the instance of the target optimizer performs any number and type of search operations on the convex hull associated with the shot sequence 132 based on the optimized shot encode point associated with the shot sequence 132.

If the instance of the target optimizer identifies any additional encoding points, then the instance of the target optimizer adds the additional encoding point(s) to the encoding list update associated with both the shot sequence 132 and the target metric value 142(t). If there are no additional encoding points included in any of the encoding list updates associated with the target metric value 142(t), then the instance of the target optimizer sets the target encoded video sequence 180(t) equal to the encoded video sequence included in the selected optimized video encode point. When an instance of the target optimizer sets the target encoded video sequence 180(t) equal to one of the encoded video sequences, the iteration controller 140 determines that the instance of the target optimizer has successfully converged and considers the target metric value 142(t) to be an "optimized" target metric value 142.

After the instances of the target optimizer generate the encoding list updates for the target metric values 142(0)-142(N), the iteration controller 140 performs consolidation operations. More specifically, for each shot sequence 132(x), the iteration controller 140 generates a corresponding consolidated encoding list update (not shown in FIG. 1) based on the different encoding list updates associated with the shot sequence 132(x). For example, if there are five target metric values 142(0)-142(4) and one hundred shot sequences 132(0)-132(99), then for each of the one hundred shot sequences 132(x), the iteration controller 140 merges the five encoding list updates associated with the shot sequence 132(x).

If there are any encoding points included in any of the consolidated encoding list updates, then the iteration controller 140 expands the encoding lists to include the consolidated encoding lists updates. The iteration controller 140 then configures the dynamic optimizer 150 to generate a new global convex hull based on the expanded encoding lists. Subsequently, the iteration controller 140 re-processes the remaining non-optimized target metric points 132 as described above. The iteration controller 140 continues to iterate in this fashion until the iteration controller 140 determines that there are no encoding points included in any of the consolidated encoding list updates.

Finally, the iteration controller 140 transmits the target encoded video sequences 180(0)-180(N) to a content delivery network (CDN) 190 for distribution to endpoint devices. In alternate embodiments, the iterative encoding application 120 and/or the iteration controller 140 may be configured to identify each of the individual encoded shot sequences that are included in the target encoded video sequences 180. The iterative encoding application 120 and/or the iteration controller 140 may then transmit the identified encoded shot sequences to the CDN 190 for distribution to endpoint devices.

Note that the techniques described herein are illustrative rather than restrictive, and may be altered without departing from the broader spirit and scope of the invention. Many modifications and variations on the functionality provided by the iterative encoding application 120, the shot analyzer 130, the iteration controller 140, the dynamic optimizer 150, the shot detector 124, the encoding application 162, and the content delivery network 190 will be apparent to those of ordinary skill in the art without departing from the scope and spirit of the described embodiments.

In some alternate embodiments, the iterative encoding application 120, the shot analyzer 130, and/or the shot detector 124 may be configured to partition the source video sequence 132 into frame sets that are not necessarily equivalent to the shot sequences 132. The iterative encoding application 120, the shot analyzer 130, and/or the shot detector 124 may be configured to partition the source video sequence 132 into the frame sets in any technically feasible fashion. A frame set may represent a variety of different constructs, including a group of pictures (GOP), a sequence of frames, a plurality of sequences of frames, and so forth. For instance, in various embodiments, one or more of the iterative encoding application 120, the shot analyzer 130, the iteration controller 140, the dynamic optimizer 150, and the encoding application 162 may be configured to identify frame sets for which a consistency metric lies within a specified range. In a complementary fashion, the iterative encoding application 120, the iteration controller 140, the dynamic optimizer 150, the encoding application 162, and the content delivery network 190 may be configured to operate on frame sets and encoded frame sets instead of the shot sequences 132 and encoded shot sequences.

As persons skilled in the art will recognize, the techniques described herein may be modified to optimize audio encoding instead of video encoding. For example, in some embodiments, an audio track may be partitioned into "audio scenes." The audio scenes may be sampled via audio rendering hardware. The sampled audio scenes may be encoded via an audio codec that is configured via a quantization parameter and/or bitrate settings. The quality scores of the encoded audio scenes may be computed via a Perceptual Evaluation of Audio Quality (PEAQ) algorithm. Notably, the resolution and/or any number of encoding parameter value(s) may be optimized for each audio scene based on any of the techniques described herein in any combination.

It will be appreciated that the system 100 shown herein is illustrative and that variations and modifications are possible. For example the functionality provided by the iterative encoding application 120, the shot analyzer 130, the iteration controller 140, the dynamic optimizer 150, the shot detector 124, the encoding application 162, and the content delivery network 190 as described herein may be integrated into or distributed across any number of software applications (including one), hardware devices (e.g., a hardware-based encoder), and any number of components of the system 100. Further, the connection topology between the various units in FIG. 1 may be modified as desired.

Figure 2A:
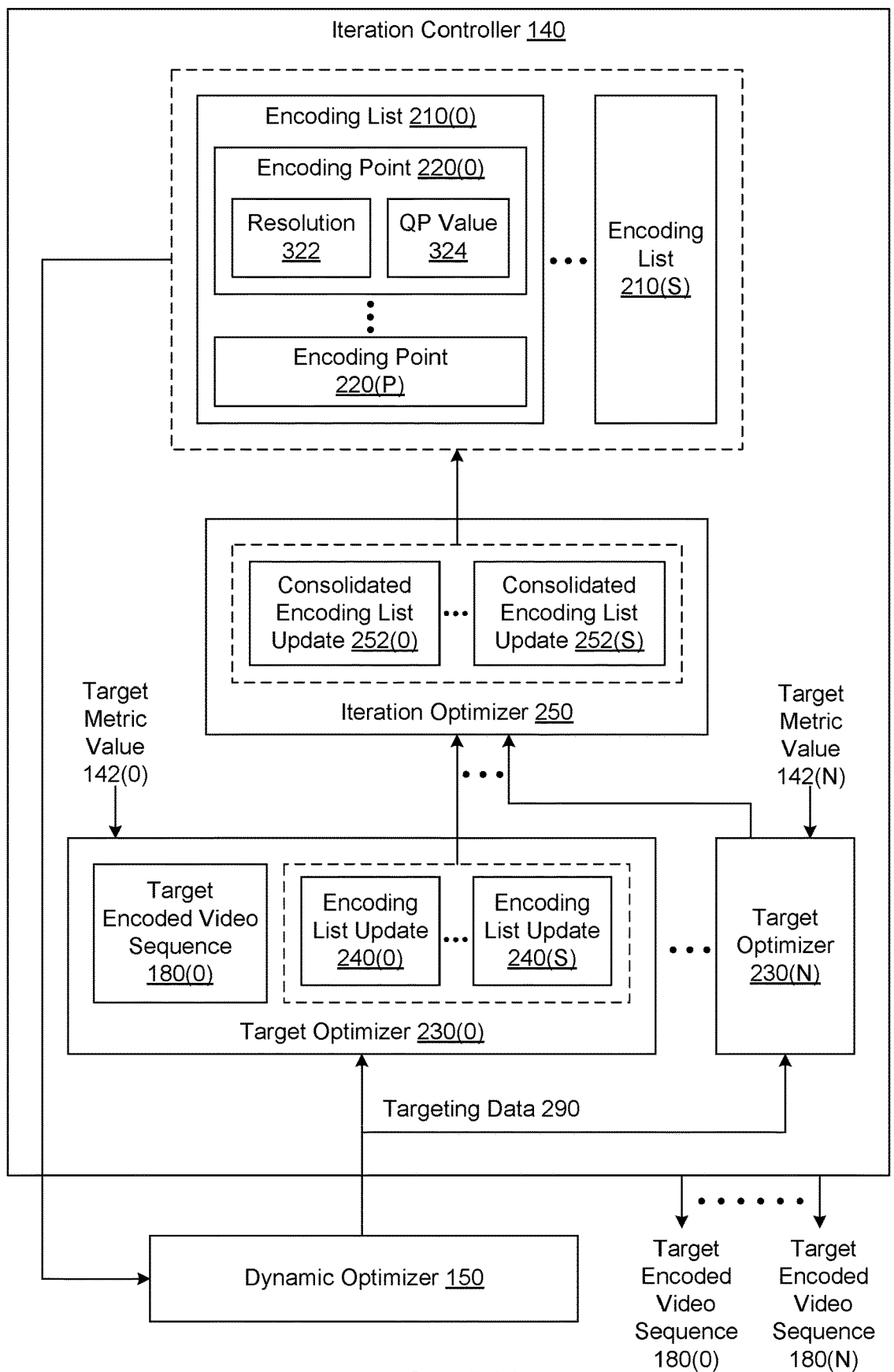
FIG. 2A is a more detailed illustration of the iteration controller of FIG. 1, according to various embodiments of the present invention.

FIG. 2A is a more detailed illustration of the iteration controller 140 of FIG. 1, according to various embodiments of the present invention. As shown, the iteration controller 140 includes, without limitation, S+1 encoding lists 210, N+1 instances of a target optimizer 230, and an iteration optimizer 250. As described in conjunction with FIG. 1, S+1 is the total number of the shot sequences 132 and N+1 is the total number of target metric values 142. Further, the encoding list 210(x) is associated with the shot sequence 132(x). For explanatory purposes only, the instance of the target optimizer 230 associated with the target metric value 142(t) is also referred to herein as the target optimizer 230(t).

Each of the encoding lists 210 includes any number of encoding points 220. Each encoding point 220 includes, without limitation, a resolution 322 and a quantization parameter (QP) value 324. The quantization parameter allows a monotonic performance in terms of bitrate and distortion when encoding video content. The higher the QP value, the lower the resulting bitrate at the expense of lower quality. In alternate embodiments, the QP value 324 may be replaced or supplemented by values for any number and type of encoding parameter values.

Notably, at any given time, the number of encoding points 220 included in the encoding list 210(x) may vary from the number of encoding points 220 included in any of the other encoding lists 210. In general, the iteration controller 140 iteratively refines the range of encoding points 220 in order to efficiently converge to the target encoded video sequences 180 that best match the target metric values 142.

Initially, for each shot sequence 132(x), the iteration controller 140 generates the encoding list 210(x) that includes a relatively sparse selection of the encoding points 220. The iteration controller 140 may generate the initial encoding lists 210 in any technically feasible fashion. For instance, in some embodiments the iteration controller 140 initializes the encoding lists 210 based on a fixed set of resolutions 322 and the codec implemented by the iterative encoding application 120.

Figure 2B:
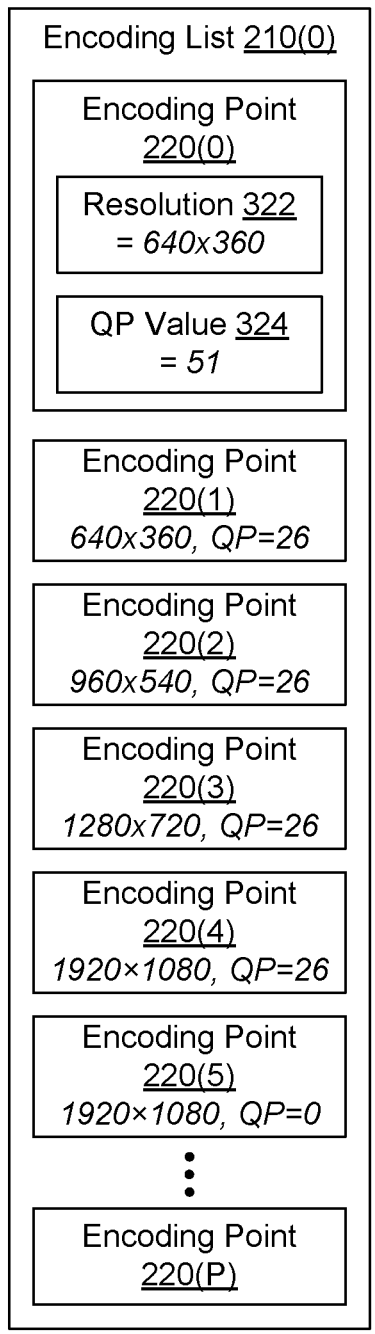
FIG. 2B is a more detailed illustration of the encoding list of FIG. 2A, according to various embodiments of the present invention.

More specifically, for each encoding list 210, the iteration controller 210 generates the encoding point 220(0) specifying a minimum resolution 322 and the maximum QP value 324 allowed by the video codec. The iteration controller 210 then generates the encoding point 220(1) specifying the minimum resolution 322 and the middle QP value 324 allowed by the video codec. For each additional resolution 322 that lies in between the maximum resolution 322 and the minimum resolution 322, the iteration controller 210 generates the encoding point 220 specifying the resolution 322 and the middle QP value 324. The iteration controller 210 then generates the encoding point 220 specifying the maximum resolution 322 and the middle QP value 324. Finally, the iteration controller 210 generates the encoding point 220 specifying the maximum resolution 322 and the minimum QP value 324 allowed by the video codec. FIG. 2B illustrates an exemplary encoding list 210(0) in greater detail.

Subsequently, as outlined in FIG. 1 and as described in greater detail in conjunction with FIGS. 3-6, the iteration controller 140 configures the dynamic optimizer 150 to generate targeting data 290 based on the encoding lists 210. The targeting data 290 includes, without limitation, the shot encode sets, the convex hulls, the video encode points, and the global convex hull. As outlined in FIG. 1 and as described in greater detail in conjunction with FIGS. 6-7, each target optimizer 230(t) independently generates a set of encoding list updates 240(0)-240(S) based on the targeting data 290 and the target metric value 142(t). Each encoding list update 240(x) includes, without limitation, any number (including 0) of encoding points that are not included in the encoding list 210(x).

Notably, if the target optimizer 230(t) determines that there are no encoding points in any of the associated encoding list updates 240, then the target optimizer 230(t) assigns the encoded video sequence that optimizes the target metric value 142(t) to the target encoded video sequence 180(t). When the target optimizer 230(t) assigns an encoded video sequence to the target encoded video sequence 180(t), the iteration controller 140 determines that the target optimizer 230(t) has successfully converged and considers the target metric value 142(t) to be an optimized target metric value 142.

After the target optimizers 230 generate the encoding list updates 240, the iteration optimizer 250 performs consolidation operations. More specifically, for each shot sequence 132(x), the iteration optimizer 250 generates a consolidated encoding list update 252(x) based on the different encoding list updates 240(x). The iteration optimizer 250 may generate the consolidated encoding list update 252(x) in any technically feasible fashion that ensures that the consolidated encoding list update 252(x) does not include any duplicated encoding points 220.

For instance in some embodiments, the iteration optimizer 250 performs any number of merging and removal operations on the encoding lists updates 240 to generate the consolidated encoding list updates 252. For example, suppose that there are five target metric values 142(0)-142(4) and one hundred shot sequences 132(0)-132(99). Together, the five target optimizers 230(0)-230((4) generate five encoding list updates 240(0), five encoding lists updates 240(1), five encoding lists updates 240(2), and so forth. The iteration optimizer 250 merges the encoding points 220 included in the five encoding list updates 240(0) and then removes any duplicated encoding points 220 to generate the consolidated encoding list update 252(0). The iteration optimizer 250 merges the encoding points 220 included in the five encoding list updates 240(1) and then removes any duplicated encoding points 220 to generate the consolidated encoding list update 252(1). The iteration optimizer 250 repeats this merge and removal process to generate each of the remaining consolidated encoding list updates 252(2)-252(99). Advantageously, by removing duplicated encoding points 220, the iteration optimizer 250 reduces redundant computations.

If there are any encoding points 220 included in any of the consolidated encoding list updates 252, then the iteration controller 140 expands each of the encoding lists 210(x) based on the consolidated encoding list update 252(x). More precisely, for each consolidated encoding list update 252(x) that includes any encoding points 220, the iteration controller 140 adds the encoding points 220 included in the consolidated encoding list update 252(x) to the encoding list 210(x).

Subsequently, the iteration controller 140 configures the dynamic optimizer 150 to generate new targeting data 290 based on the expanded encoding lists 210(0)-120(S). After receiving the new targeting data 290, the iteration controller 140 configures each non-converged target optimizer 230 to process the new targeting data 290. The iteration optimizer 250 then re-generates the consolidated encoding list updates 250(0)-250(S). The iteration controller 140 continues to iterate in this fashion until the iteration controller 140 determines there are no additional encoding points 220 included in any of the consolidated encoding list updates 252. After the iteration controller 140 finishes iterating, the iteration controller 140 transmits the target encoded video sequences 180 to the content delivery network (CDN) 190 for distribution to endpoint devices.

FIG. 2B is a more detailed illustration of the encoding list 210(0) of FIG. 2A, according to various embodiments of the present invention. For explanatory purposes only, exemplary resolutions and values for the first five points included in each of the encoding lists 210 are depicted in italics. As shown, the encoding point 220(0) includes the resolution 322 of 640×360 and the QP value 324 of 51, the encoding point 220(1) includes the resolution 322 of 640×360 and the QP value 324 of 26, the encoding point 220(2) includes the resolution 322 of 960×540 and the QP value 324 of 26, the encoding point 220(3) includes the resolution 322 of 1280×720 and the QP value 324 of 26, the encoding point 220(4) includes the resolution 322 of 1920×1080 and the QP value 324 of 26, and the encoding point 220(5) includes the resolution 322 of 1920×1080 and the QP value 324 of 0. As described in conjunction with FIG. 2A, at any given time, the number of encoding points 220 included in the encoding list 210(0) may vary from the number of encoding points 220 included in any of the other encoding lists 210(1)-210(S).

Generating Different Encoded Video Sequences

Figure 3:
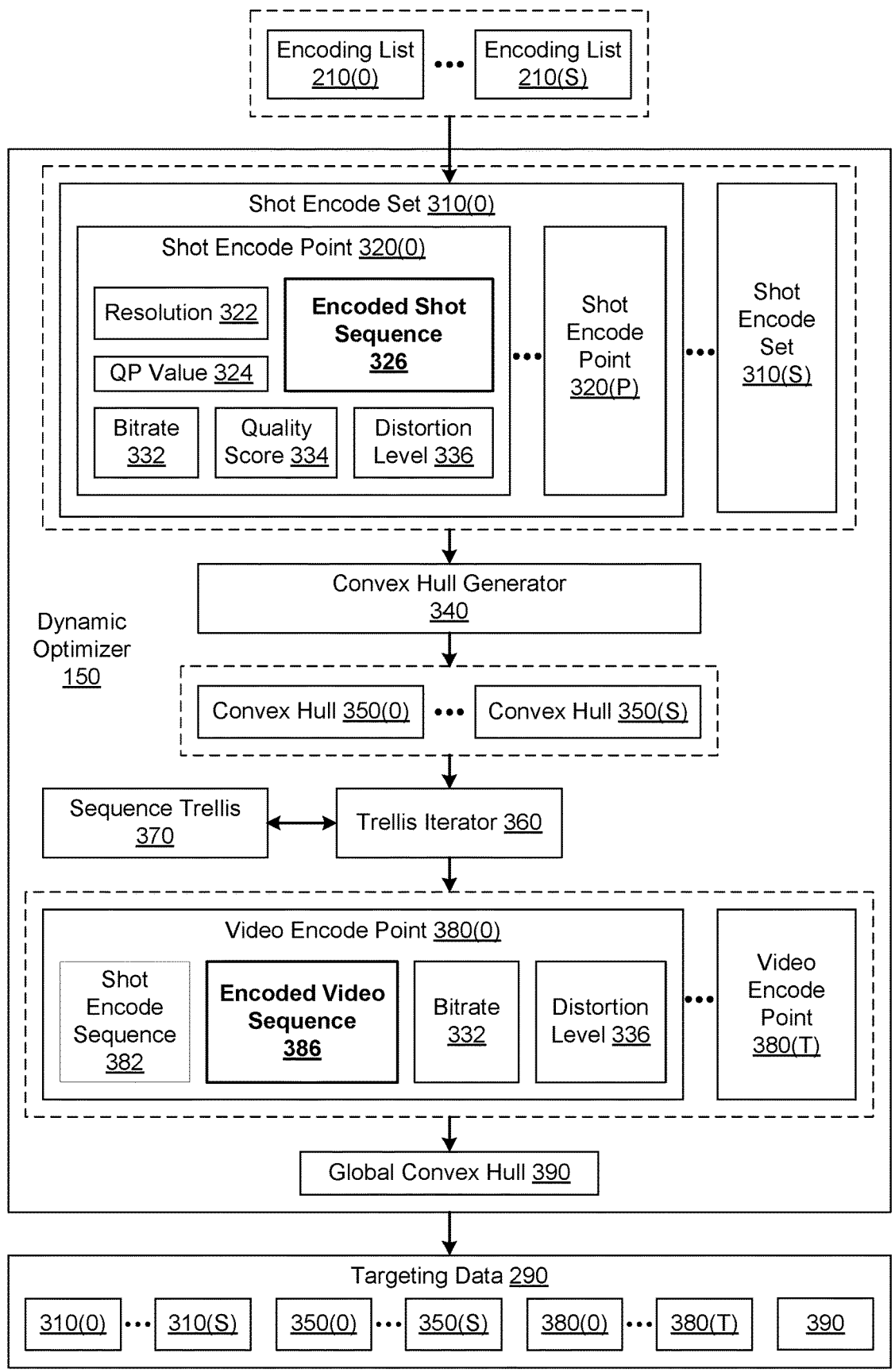
FIG. 3 is a more detailed illustration of the dynamic optimizer of FIG. 1, according to various embodiments of the present invention.

FIG. 3 is a more detailed illustration of the dynamic optimizer 150 of FIG. 1, according to various embodiments of the present invention. As shown, the dynamic optimizer 150 includes, without limitation, shot encode sets 310, a convex hull generator 340, convex hulls 350, a trellis iterator 360, a sequence trellis 370, any number of video encode points 380, and a global convex hull 390. The total number of the shot encode sets 310 equals the number of shot sequences 132. Similarly, the total number of the convex hulls 340 equals the number of shot sequences 132. In general, the shot sequence 132(x) is associated with both the shot encode set 310(x) and the convex hull 340(x).

Each of the shot encode sets 310 includes, without limitation, any number of shot encode points 320. The number of shot encode points 320 included in the shot encode set 310(x) may differ from the number of shot encode points 320 included in any of the other shot encode sets 310. Each of the shot encode points 320 includes, without limitation, the resolution 322, the QP value 324, an encoded shot sequence 326, a bitrate 332, any number of quality scores 334, and a distortion level 336. In alternate embodiments, the shot encode point 320 may include any number and type of encoding parameter values instead of or in addition to the QP value 324.

When the dynamic optimizer 150 initially receives the encoding lists 210(0)-210(S) from the iteration controller 140, the dynamic optimizer 150 generates the shot encode sets 310(0)-310(S). For each encoding point 220(y) included in each encoding list 210(x), the dynamic optimizer 150 generates a corresponding shot encode point 320(y) and adds the shot encode point 320(y) to the shot encode set 310(x). More specifically, the dynamic optimizer 150 generates a new encoded shot sequence 326 based on the shot sequence 132(x), the resolution 322 and the QP value 324 included in the encoding point 220(y).

The dynamic optimizer 150 computes the bitrate 332, the quality score 334, and the distortion level 336 associated with the encoded shot sequence 326. The dynamic optimizer 150 then generates the shot encode point 320(y) that includes, without limitation, the encoded shot sequence 326 as well as the resolution 322, the QP value 324, the bitrate 332, the quality score 334, and the distortion level 336 associated with the encoded shot sequence 326. Finally, the dynamic optimizer 150 includes the new shot encode point 320(y) in the shot encode set 310(x).

Subsequently, upon receiving one or more updated encoding lists 210, the dynamic optimizer 150 identifies any "new" encoding points 220. In operation, for the encoding list 210(x), the dynamic optimizer 150 determines which (if any) of the encoding points 220 are not represented by the shot encode set 310(x). For each new encoding point 220(y) included in the encoding list 210(x), the dynamic optimizer 150 generates a corresponding shot encode point 320(y) and adds the new shot encode point 320(y) to the shot encode set 310(x).

The dynamic optimizer 150 may generate the encoded shot sequence 326 and determine the associated quality score 334, associated bitrate 332, and the associated distortion level 336 in any technically feasible fashion. To generate the encoded shot sequence 326, in some embodiments, the dynamic optimizer 150 performs sampling operations on the video content based on the resolution 322 to generate sampled video content. Subsequently, the dynamic optimizer 150 configures the encoding application 162 to encode the sampled video content using the QP value 324 to generate the encoded shot sequence 326. The dynamic optimizer 150 may generate the encoded shot sequence 326 based on any technically feasible encoding algorithm(s) in any technically feasible fashion. Examples of encoding algorithms include advanced video coding (AVC), and high-efficiency video encoding (HEVC), to name a few.

In some embodiments, to determine the quality score 334 associated with the encoded shot sequence 326, the dynamic optimizer 150 decodes the encoded shot sequence 326 to generate a decoded shot sequence. The dynamic optimizer 150 then re-samples (i.e., up-samples or down-samples) the decoded shot sequence to a target resolution to generate a re-constructed shot sequence that is relevant to the display characteristics of a class of endpoint devices.

In alternate embodiments, the dynamic optimizer 150 may compute any number of quality scores 334 for any number of resolutions. For example, a certain video may be delivered in 3840×2160 resolution, yet be intended to be consumed by a large number of displays in 1920×1080 resolution. Another class of endpoint devices, for example laptop computers, is expected to display the same video in 1280×720 resolution. Yet another class of endpoint devices, for example, tablet or smartphone devices, is expected to display the same video in 960×540 resolution. The dynamic optimizer 150 could up-sample the decoded shot sequence to all these target resolutions in order to assess quality, when considering one of these different classes of endpoint devices, correspondingly.

The dynamic optimizer 150 then analyzes the re-constructed shot sequence to generate the quality score 334 for an objective quality metric (QM). For instance, in some embodiments the dynamic optimizer 150 implements a VMAF (or harmonic VMAF) algorithm to generate a VMAF score for each encoded shot sequence 326 based on the associated re-constructed shot sequence. Although a multitude of video quality metrics, such as VMAF scores, can be calculated at different target resolutions, it should be clear that, when comparing qualities among encoded shot sequences 326 associated with different resolutions 322, applications need to use the same target resolution for re-sampling, after decoding. For instance, in some embodiments, the dynamic optimizer 150 re-samples the decoded shot sequence to 1920×1080 to generate the re-constructed shot sequence for each encoded shot sequence 326. Subsequently the dynamic optimizer computes the quality score 334 for the encoded shot sequence 326 based on the associated re-constructed shot sequence.

The dynamic optimizer 150 may generate the bitrate 332 based on the resolution 334 in any technically feasible fashion. For instance, in some embodiments, the dynamic optimizer 150 may divide the total number of bits needed for the resolution 322 by the length of the associated shot sequence 132. In the same or other embodiments, the dynamic optimizer 150 may compute the distortion level 336 based on the quality score 334 and any technically feasible technique for converting quality to distortion. For example, the dynamic optimizer 150 could invert the quality score 334 to determine the distortion level 336. In another example, the dynamic optimizer 150 could subtract the quality score 334 from a constant value to determine the distortion level 336.

For each of the shot sequences 132(x), the convex hull generator 340 generates a convex hull 350(x) based on the shot encode set 310(x). Each of the convex hulls 350(x) includes, without limitation, the shot encode points 320 included in the shot encode set 310(x) that minimize bitrate for a given level of distortion. A detailed example of how the convex hull generator 340 generates the convex hull 350(0) based on the shot encode set 310(0) is described in conjunction with FIG. 4.

As shown, and as described in detail in conjunction with FIG. 5, the trellis iterator 360 receives the convex hulls 350 and then iteratively updates a sequence trellis 370 to generate any number of video encode points 380. The trellis iterator 360 is a software module, and the sequence trellis 370 is a data structure that is described in greater detail below in conjunction with FIGS. 5A-5D.

Each of the video encode points 380 includes, without limitation, a shot encode sequence 382, an encoded video sequence 386, the bitrate 332, and the distortion level 336. The shot encode sequence 382 includes, without limitation, S+1 shot encode points 320—a different shot encode point 320 for each of the shot sequences 132. The encoded video sequence 386 includes, without limitation, the S+1 encoded shot sequences 326 included in the S+1 shot encode points 320 included in the shot encode sequence 382. The bitrate 332 and the distortion level 336 specify, respectively, a global bitrate and a global distortion level for the encoded video sequence 386.

As described in greater detail in conjunction with FIGS. 5A-5D, the trellis iterator 360 generates the video encode points. Subsequently, the dynamic optimizer 150 generates the global convex hull 390 based on the video encode points 380. After generating the global convex hull 390, the dynamic optimizer 150 provides the targeting data 290 to the iteration controller 140. As shown, the targeting data 290 include, without limitation, the shot encode sets 310, the convex hulls 350, the video encode points 380, and the global convex hull 390.

Figure 4:
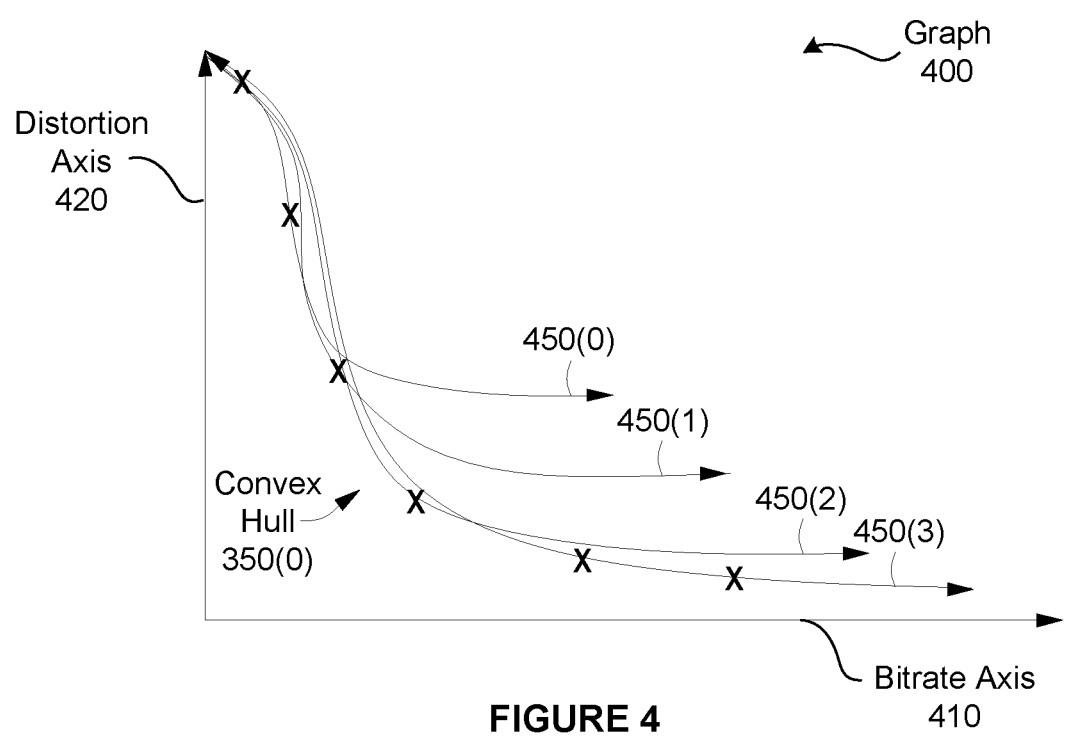
FIG. 4 illustrates an exemplary convex hull that is generated by the convex hull generator of FIG. 3, according to various embodiments of the present invention.

FIG. 4 illustrates an exemplary convex hull 350(0) that is generated by the convex hull generator 340 of FIG. 3, according to various embodiments of the present invention. In particular, the convex hull generator 340 generates the convex hull 350(0) based on the shot encode set 310(0). As shown, a graph 400 includes, without limitation, a bitrate axis 410 and a distortion axis 420.

In operation, the convex hull generator 340 distributes the shot encode points 320 included in the shot encode set 310(0) into different subsets based on the resolution 322. Subsequently, for each resolution-specific subset, the convex hull generator 340 plots each of the shot encode points 320 by locating the bitrate 332 along the bitrate axis 410 and the distortion level 336 along the distortion axis 420 to generate a corresponding distortion curve 450. In this fashion, the convex hull generator 340 generates the distortion curves 450(0)-450(3), where each of the distortion curves 450 corresponds to a different resolution 322 and includes one or more shot encode points 320.

After generating the distortion curves 450, the convex hull generator 340 evaluates the shot encode points 320 along the distortion curves 450 to determine the convex hull 350(0). More specifically, the convex hull generator 340 identifies the shot encode points 320 across all the distortion curves 450 that form a boundary where all the shot encode points 320 reside on one side of the boundary (in this case, the right side of the boundary) and also are such that connecting any two consecutive identified shot encode points 320 with a straight line leaves all remaining shot encode points 320 on the same side. The convex hull 350(0) includes the set of the identified shot encode points 320.

Persons skilled in the art will understand that many techniques for generating convex hulls are well known in the field of mathematics, and all such techniques may be implemented to generate the convex hulls 350. In one embodiment, the convex hull generator 340 applies machine-learning techniques to estimate the shot encode points 320 included in the convex hull 350 based on various parameters of the associated source video sequence 132. In this manner, some of the computations discussed thus far may be streamlined and/or avoided entirely.

FIGS. 5A-5D are more detailed illustrations of how the trellis iterator 360 of FIG. 3 assembles the encoded shot sequences 326 into the encoded video sequences 386, according to various embodiments of the present invention. As shown in FIGS. 5A-5D, the sequence trellis 370 includes, without limitation, a shot axis 520 and the bitrate axis 410. The sequence trellis 370 also includes, without limitation, columns of the shot encode points 320 included in the convex hulls 350, where each column corresponds to a particular shot sequence 132. For example, the zeroth column included in the sequence trellis 370 corresponds to the shot encode points 320 included in the convex hull 350(0). The shot encode points 320 included in any column are ranked according to ascending bitrate 332 (and, by construction, descending distortion levels 336). The "hull" shot encode points 320 included in any column are also guaranteed to have negative slopes that—in magnitude—are decreasing as a function of the bitrate 332.

For convenience, the hull shot encode points 320 are individually indexed according to the following system. For a given hull shot encode point 320, the first number is an index of the shot sequence 132, and the second number is an index into the bitrate ranking of those hull shot encode points 320. For example, the hull shot encode point 320 00 corresponds to the zeroth shot sequence 132(0) and the zeroth ranked bitrate 332. Similarly, the hull shot encode point 320 43 corresponds to the fourth shot sequence 332(4) and the third-ranked bitrate 332 (in this case the highest ranked bitrate 332).

As previously described in conjunction with FIG. 3, each hull shot encode point 320 included within the sequence trellis 370 includes a different encoded shot sequence 326. The trellis iterator 360 generates the encoded video sequences 386 by combining these encoded shot sequences 326. The trellis iterator 360 implements the sequence trellis 370 to iteratively perform this combining technique.

Each of FIGS. 5A-5D illustrates a different version of the sequence trellis 370 generated by the trellis iterator 360 at a different iteration. FIG. 5A illustrates the sequence trellis 370(0) in an initial state. Here, the trellis iterator 360 generates the shot encode sequence 382(0) that includes the hull shot encode points 320 00, 10, 20, 30, and 40. These initially selected hull shot encode points 320 have the lowest bitrate 332 and highest distortion levels 336, and therefore reside at the bottom of the respective columns.

The trellis iterator 360 generates the encoded video sequence 386(0) based on the shot encode sequence 382(0). More precisely, the trellis iterator 360 aggregates the encoded shot sequences 326 included in, sequentially, the hull shot encode points 00, 10, 20, 30, and 40 to generate the encoded video sequence 386(0). Subsequently, the trellis iterator 360 computes the bitrate 332 and the distortion level 336 of the encoded video sequence 386(0). The trellis iterator 360 may compute the bitrate 332 and the distortion level 336 of the encoded video sequence 386(0) in any technically feasible fashion. The trellis iterator 360 then generates the video encode point 380(0) that includes, without limitation, the shot encode sequence 382(0), the encoded video sequence 386(0), the bitrate 332 of the encoded video sequence 386(0), and the distortion level 336 of the encoded video sequence 386(0).

The trellis iterator 360 then computes, for each hull shot encode point 320 within the shot encode sequence 382(0), the rate of change of distortion with respect to bitrate 332 between the hull shot encode point 320 and the above-neighbor of the hull shot encode point 320. For example, the trellis iterator 360 could compute the rate of change of distortion with respect to bitrate 332 between nodes 00 and 01, 10 and 11, 20 and 21, 30 and 31, and 40 and 41. Notably, the computed rate of change for the hull shot encode point 320 that includes a particular encoded shot sequence 326 represents the derivative of the distortion curve 450 associated with that shot sequence 132, taken at the hull shot encode point 320.

The trellis iterator 360 selects the derivative having the greatest magnitude, and then selects the above neighbor associated with that derivative for inclusion in a subsequent shot encode sequence 382. For example, in FIG. 5B, the trellis iterator 360 determines that the derivative associated with hull shot encode point 320 30 is greatest, and therefore includes hull shot encode point 320 31 (the above-neighbor of hull shot encode point 320 30) in the shot encode sequence 382(1). In particular, as shown, the trellis iterator 360 generates the shot encode sequence 382(1) that includes the hull shot encode points 320 00, 10, 20, 31, and 40.

The trellis iterator 360 then generates the encoded video sequence 386(1) based on the shot encode sequence 382(1). More precisely, the trellis iterator 360 aggregates the encoded shot sequences 326 included in, sequentially, the hull shot encode points 00, 10, 20, 31, and 40 to generate the encoded video sequence 386(1). Subsequently, the trellis iterator 360 computes the bitrate 332 and the distortion level 336 of the encoded video sequence 386(1). The trellis iterator 360 then generates the video encode point 380(1) that includes, without limitation, the shot encode sequence 382(1), the encoded video sequence 386(1), the bitrate 332 of the encoded video sequence 386(1), and the distortion level 336 of the encoded video sequence 386(1).

The trellis iterator 360 performs this technique iteratively, thereby ascending the sequence trellis 370, as shown in FIGS. 5C-5D. In FIG. 5C, the trellis iterator 360 determines that the derivative associated with the hull shot encode point 320 00 is greatest compared to other derivatives, and therefore selects the hull shot encode point 320 01 for inclusion in the shot encode sequence 382(2). As shown, the trellis iterator 360 generates the shot encode sequence 382(2) that includes the hull shot encode points 320 01, 10, 20, 31, and 40.

The trellis iterator 360 then generates the encoded video sequence 386(2) based on the shot encode sequence 382(2). More precisely, the trellis iterator 360 aggregates the encoded shot sequences 326 included in, sequentially, the hull shot encode points 01, 10, 20, 31, and 40 to generate the encoded video sequence 386(2). Subsequently, the trellis iterator 360 computes the bitrate 332 and the distortion level 336 of the encoded video sequence 386(2). The trellis iterator 360 then generates the video encode point 380(2) that includes, without limitation, the shot encode sequence 382(2), the encoded video sequence 386(2), the bitrate 332 of the encoded video sequence 386(2), and the distortion level 336 of the encoded video sequence 386(2).

The trellis iterator 360 continues this process until, as shown in FIG. 5D, generating the video encode point 380(T). The video encode point 380(T) includes, without limitation, the shot encode sequence 382(T), the encoded video sequence 386(T), the bitrate 332 of the encoded video sequence 386(T), and the distortion level 336 of the encoded video sequence 386(T).

In this manner, the trellis iterator 360 incrementally improves the shot encode sequence 382 by selecting a single hull shot encode point 320 for which bitrate is increased and distortion is decreased, thereby generating a collection of encoded video sequences 386 with increasing bitrate and decreasing distortion.

In one embodiment, the trellis iterator 360 adds hull shot encode points 320 prior to ascending the sequence trellis 370 in order to create a terminating condition. In doing so, the trellis iterator 360 may duplicate hull shot encode points 320 having the greatest bitrate 332 to cause the rate of change between the second to last and the last hull shot encode points 320 to be zero. When this zero rate of change is detected for all the shot sequences 132, i.e., when the maximum magnitude of rate of change is exactly zero, the trellis iterator 360 identifies the terminating condition and stops iterating.

Generating New Encoding Points

Figure 6:
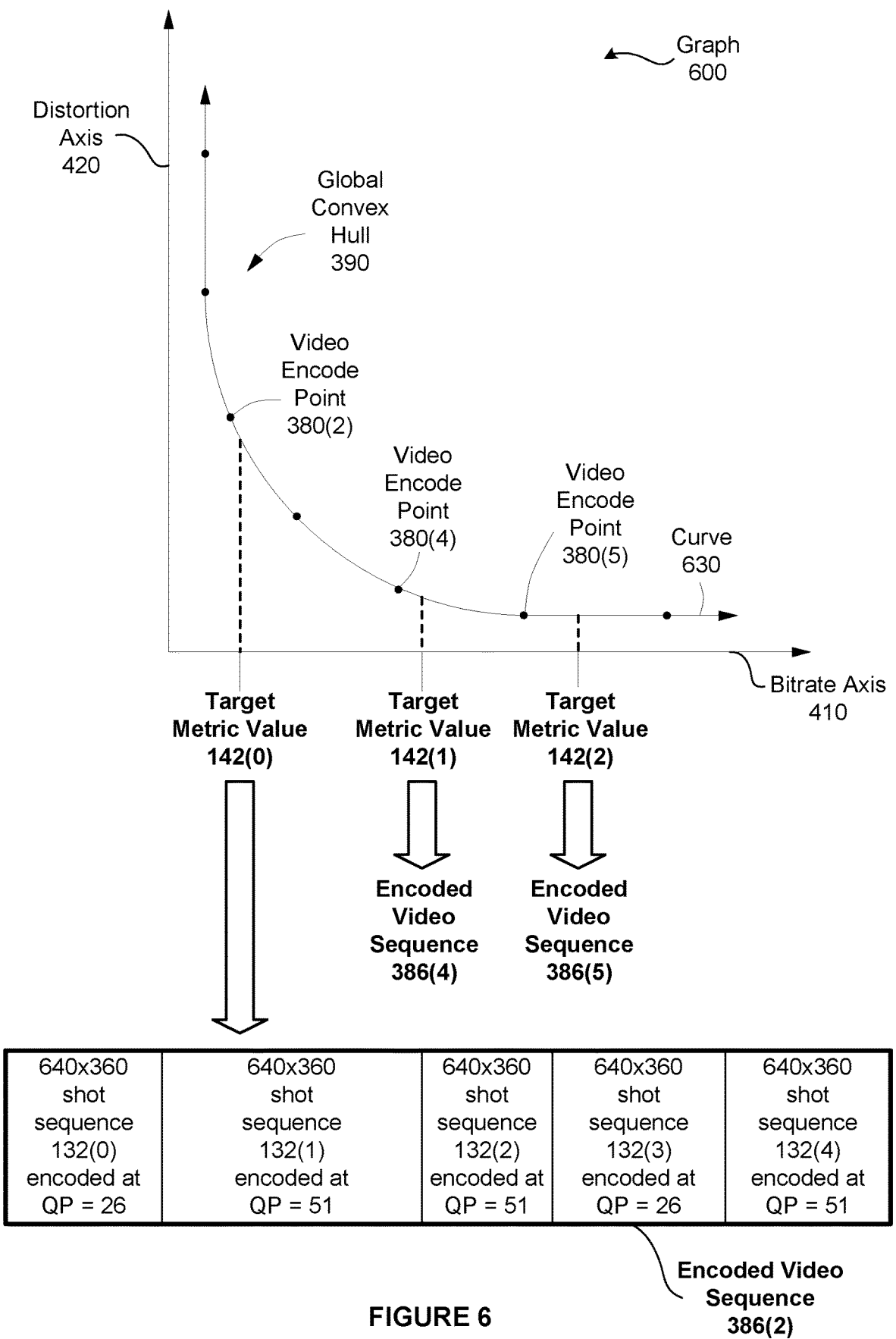
FIG. 6 illustrates an exemplary global convex hull that is generated by the dynamic optimizer of FIG. 1 using the video encode points shown in FIGS. 5A-5D, according to various embodiments of the present invention.

FIG. 6 illustrates an exemplary global convex hull 390 that is generated by the dynamic optimizer 150 of FIG. 1 using the video encode points 380 shown in FIGS. 5A-5D, according to various embodiments of the present invention. As shown, a graph 600 includes the bitrate axis 410 and the distortion axis 420.

As described in detail in conjunction with FIGS. 5A-D, the trellis iterator 360 generates the shot encode sequence 382 in an ascending manner to reduce the distortion level 336 and increase the bitrate 332. Consequently, the associated encoded video sequences 386 span a range from high distortion level 336 and low bitrate 332 to low distortion level 336 and high bitrate 332. Among other things, each of the video encode points 380($x$) includes the bitrate 332 of the encoded video sequence 386($x$) and the distortion level 336 of the encoded video sequence 386($x$).

As shown, the dynamic optimizer 150 plots the different video encode points 380 against the bitrate axis 410 and the distortion axis 420, to generate the global convex hull 390. The dynamic optimizer 150 then connects the points (i.e., the video encode points 380) included in the global convex hull 390 to generate a curve 630. Accordingly, the curve 630 represents the distortion level 336 as a function of the bitrate 332 across all the encoded video sequences 386.

In general, based on the curve 630, the iteration controller 140 can select, for a given bitrate 332, the video encode point 380 that includes the encoded video sequence 386 that minimizes the distortion level 336. Conversely, the iteration controller 140 can select, for a given distortion level 336, the video encode point 380 that includes the encoded video sequence that minimizes the bitrate 332 for the given distortion level 336.

In operation, each the target optimizers 230(0)-230(N) selects the "optimized" video encode point 380 based on, respectively, the target metric values 142(0)-142(N). The target metric value 142($t$) may be a target bitrate 332($t$), a target quality score 334($t$), or a target distortion level 336($t$), to name a few. In the embodiment depicted in FIG. 6, the target metric value 142($t$) is a target bitrate 332($t$). Accordingly, the target optimizer 230($t$) selects the optimized video encode point 380 that includes the encoded video sequence 386 having the bitrate 332 that lies closest to the target metric value 142($t$).

As shown, based on the target metric value 142(0), the target optimizer 230(0) selects the optimized video encode point 380(2) that includes the encoded video sequence 386(2). Notably, the encoded video sequence 386(2) is the encoded video sequence 386 that minimizes the distortion level 336 for the target bitrate 332(0). In alternate embodiments, the target optimizer 230(0) selects the optimized video encode point 380 that includes the encoded video sequence 386 having the quality score 334 or the distortion level 336 that lies closest to the target metric value 142(0). Notably, the optimized video encode point 380(2) also includes the "optimized" shot encode sequence 382(2).

In a similar fashion, the target optimizer 230(1) selects the optimized video encode point 380(4) that includes the encoded video sequence 386(4) based on the target metric value 142(1). In addition, the target optimizer 230(2) selects the optimized video encode point 380(5) that includes the encoded video sequence 386(5) based on the target metric value 142(2). Subsequently, as described previously in conjunction with FIG. 2, each of the target optimizers 230(0)-230(N) that has not yet converged generates a different set of encoding lists updates 240(0)-240(S). Accordingly, the iteration controller 140 generates as many as (N+1)*(S+1) encoding list updates 240.

As described previously in conjunction with FIGS. 2 and 5A-5D, the shot encode sequence 382(2) specifies the shot encode points 320 that include encoded shot sequences 326 that are included in the encoded video sequence 386(2). As shown, the encoded video sequence 386(2) includes the encoded shot sequence 326 derived from a 640×360 version of the shot sequence 132(0) and encoded using the QP value of 26, followed by the encoded shot sequence 326 derived from a 640×360 version of the shot sequence 132(1) and encoded using the QP value of 51, followed by the encoded shot sequence 326 derived from a 640×360 version of the shot sequence 132(2) and encoded using the QP value of 51, etc.

In general, each of the "optimized" shot encode points 320 included in the "optimized" shot encode sequence 382 is associated with a different shot sequence 132. For each shot sequence 132(x) included in the selected encoded video sequence 386(2), the target optimizer 230(0) evaluates the location of the associated optimized shot encode point 320 along the associated convex hull 350(x) to identify one or more nearby shot encode points 320 points on the convex hull 350(x). Based on the resolutions 322 and the QP values 324 of the optimized shot encode point 320 and the nearby shot encode points 320, the target optimizer 230(0) generates the encoding list update 240(x) associated with both the target metric value 142(0) and the shot sequence 132(x). As part of generating the encoding list update 240(x), the target optimizer 230(0) may generate any number of additional encoding points 220 for the shot sequence 132(x).

As previously described in conjunction with FIG. 2, after the target optimizers 230 that have not yet converged have generated the encoding list updates 240(0)-240(S) for the associated target metric values 142, the iteration optimizer 250 performs consolidation operations. More specifically, for each shot sequence 132(x), the iteration optimizer 250 generates the corresponding consolidated encoding list update 252(x) based on the different encoding list updates 240(x) associated with the shot sequence 132(x). If there are any encoding points 220 included in any of the consolidated encoding list updates 252, then the iteration controller 140 expands the encoded lists 210. The iteration controller 140 then configures the dynamic optimizer 150 to generate new targeting data 290 based on the expanded encoding lists 210. In this manner, the iteration controller 140 iteratively refines the range of the encoding points 220 in order to efficiently converge to the target encoded video sequences 180(0)-180(N) that best match, respectively, the target metric values 142(0)-142(N).

Figure 7:
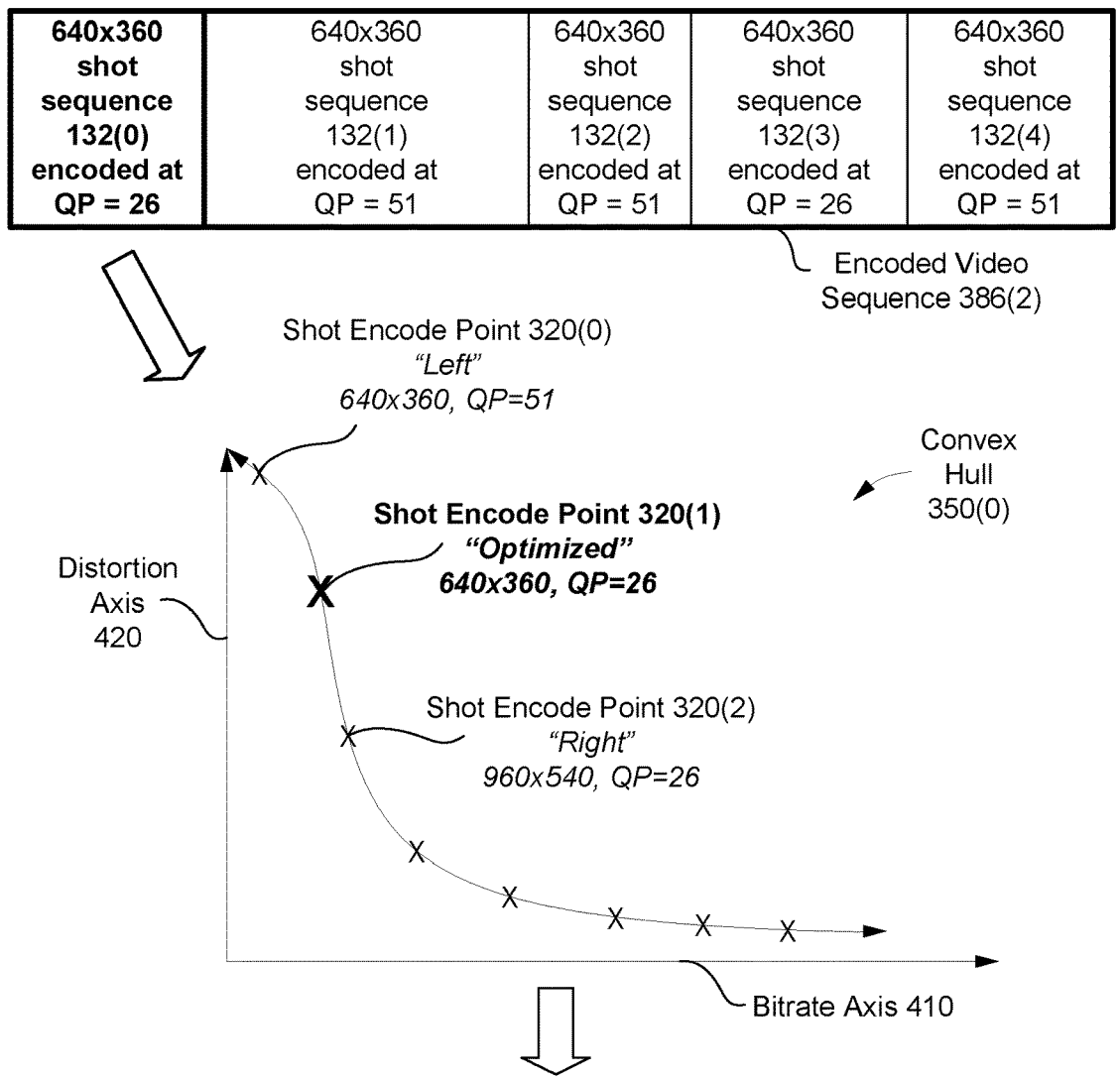
FIG. 7 illustrates how the target optimizer of FIG. 2 generates additional encoding points for a shot sequence, according to various embodiments of the present invention.

FIG. 7 illustrates how the target optimizer 230(0) of FIG. 2 generates additional encoding points 220 for the shot sequence 132(0), according to various embodiments of the present invention. As described in detail in conjunction with FIG. 6, the target optimizer 230(0) identifies the shot encode point 320(1) that includes the 640×360 shot sequence 132(0) encoded using the QP value 324 of 26 as the optimized shot encode point 320 for the combination of the shot sequence 132(0) and the target metric value 142(0). Subsequently, the target optimizer 230(0) generates any number (including zero) of additional encoding points 220 and generates the encoding list update 240(0) that includes the additional encoding points 220. As described previously herein, the encoding list update 240(0) includes encoding points 220 for the shot sequence 132(0) that are tailored to the target metric value 142(0) and are not already included in the encoding list 210(1).

In some embodiments, the target optimizer 230(0) generates zero to four additional encoding points 220 based on a linear interpolation algorithm. The target optimizer 230(0) implements the following algorithm to generate additional encoding points 220. First, the target optimizer 230(0) identifies the "left" shot encode point 320 that is located to the left and adjacent to the optimized shot encode point 320 along the convex hull 350(0). If the left shot encode point 320 has the same resolution 322 as the optimized shot encode point 320, then the target optimizer 230(0) generates an additional encoding point 220 that has the resolution 322. The target optimizer 230(0) sets the QP value 324 of the additional encoding point equal to the average of the QP values 324 of the optimized shot encode point 320 and the left shot encode point 320.

If, however, the left shot encode point 320 does not have the same resolution 322 as the optimized shot encode point 320, then the target optimizer 230(0) generates two additional encoding points 210. The target optimizer 230(0) sets the resolution 322 of the first additional encoding point 220 equal to the resolution 322 of the optimized shot encode point 320. The target optimizer 230(0) sets the QP value 324 of the first additional encoding point 220 to the average of the QP value 324 of the optimized shot encode point 320 and the maximum QP value 324 allowed by the video codec. The target optimizer 230(0) sets the resolution 322 of the second additional encoding point 220 equal to the resolution 322 that is immediately lower than the resolution 322 of the optimized shot encode point 320. The iteration controller 142 sets the QP value 324 of the second additional encoding point 220 to the minimum QP value 324 allowed by the video codec.

The target optimizer 230(0) then identifies the "right" shot encode point 320 that is located to the right and adjacent to the optimized shot encode point 320 along the convex hull 350(0). If the right shot encode point 320 has the same resolution 322 as the optimized shot encode point 320, then the target optimizer 230(0) generates an additional encoding point 220 that has the resolution 322. The target optimizer 230(0) sets the QP value 324 of the additional encoding point equal to the average of the QP values 324 of the optimized shot encode point 320 and the right shot encode point 320.

If, however, the right shot encode point 320 does not have the same resolution 322 as the optimized shot encode point 320, then the target optimizer 230(0) generates two additional encoding points 220. The target optimizer 230(0) sets the resolution 322 of the first additional encoding point 220 equal to the resolution 322 of the optimized shot encode point 320. The target optimizer 230(0) sets the QP value of the first additional encoding point 220 to the average of the QP value 324 of the optimized shot encode point 320 and the minimum QP value 324 allowed by the video codec. The target optimizer 230(0) sets the resolution 322 of the second additional encoding point 220 equal to the resolution 322 that is immediately higher than the resolution 322 of the optimized shot encode point 320. The target optimizer 230(0) sets the QP value 324 of the second additional encoding point 220 to the maximum QP value 324 allowed by the video codec.

Linear interpolation operations 710 depict exemplary linear interpolation operations performed by the target optimizer 230(0). As shown, the optimized shot encode point 320(1) has the resolution 322(1) of 640×360 and the QP value 324(1) of 26. The left shot encode point 320(0) has the resolution 322(0) of 640×360 and the QP value 324(0) of 51. The right shot encode point 320(2) has the resolution 322(2) of 960×540 and the QP value 324(2) of 26. According, the target optimizer 230(0) generates the additional encoding points 220(6), 220(7), and 220(8) (there are already six encoding points 220(0)-220(5) included in the encoding list 210(0)). The encoding point 220(6) has the resolution of 322(6) of 640×360 and the QP value 324(6) of (51+26)/2=39. The encoding point 220(7) has the resolution of 322(7) of 640×360 and the QP value 324(7) of (26+1)/2=14. The encoding point 220(8) has the resolution 322(8) of 960×540 and the QP value 324(8) of (26+51)/2=39.

In alternate embodiments, the target optimizer 230(0) may implement any number and type of algorithms to generate additional encoding points 220. For instance, in some embodiments, the target optimizer 230(0) does not restrict the search for additional encoding points 220 based on the convex hull 350. Instead, the target optimizer 230(0) expands the search to the left of the optimized shot encode point 320, among all available resolutions 322, to identify the shot encode point 320 having a resolution 322 that is closest but lower than the resolution 322 of the optimized shot encode point 320 and a bitrate 324 just lower. The target optimizer 230(0) then generates an additional encoding point 220 having the resolution 322 of the identified shot encode point 320 and the QP value 324 that is the average of the QP value 324 of the selected shot encode point 320 and one at the same resolution 322 and a slightly lower QP value 324.

In a complementary fashion, the target optimizer 230(0) expands the search to the right of the optimized shot encode point 320, among all available resolutions 322, to identify the shot encode point 320 having a resolution 322 that is closest but higher than the resolution 322 of the optimized shot encode point 320 and a bitrate 324 just higher than the bitrate 324 of the optimized shot encode point 320. The target optimizer 230(0) then generates an additional encoding point 220 having the resolution 322 of the identified shot encode point 320 and QP value that is the average between the QP value 324 of the selected shot encode point 320 and one at the same resolution 322 and a slightly higher QP value 324.

In various embodiments, the target optimizer 230(0) generates one or more interpolation equations based on an interpolation algorithm, the convex hull 350(0), and any number (including zero) of constraints. Subsequently, the target optimizer 230(0) computes the additional encoding points 220 based on the interpolation equations and the optimized shot encode point 320(1). For instance, in some embodiments, for each of any number of resolutions 322, the target optimizer 230(0) generates a convex cubic spline equation based on a spline interpolation algorithm, a convexity constraint, and the convex hull 350(0). In other embodiments, for each of any number of resolutions 322, the target optimizer 230(0) generates a concave cubic spline equation based on a spline interpolation algorithm, a concavity constraint, and a concave quality score/bitrate curve derived from the convex hull 350(0).

In some embodiments, the target optimizer 230(0) implements a polynomial interpolation algorithm. In general, a polynomial interpolation algorithm generates an interpolation polynomial of degree n−1 or less that passes through n given points. The target optimizer 230(0) may implement any type of polynomial interpolation algorithm in any technically feasible fashion. Examples of polynomial interpolation algorithms include, without limitation, Lagrange interpolation, Neville's algorithm, barycentric interpolation, Aitken's algorithm, and so forth.

Polynomial interpolation operations 720 depict exemplary polynomial interpolation operations that may be performed by the target optimizer 230(0). First, as described above, the target optimizer 230(0) identifies the optimized shot encode point 320(1), the left shot encode point 320(0) and the right shot encode point 320(2). For each different resolution 322 associated with any of the optimized shot encode point 320(1), the left shot encode point 320(0), and the right shot encode point 320(2), the target optimizer 230(0) generates a different interpolation polynomial. Because the left shot encode point 320(0) and the optimized shot encode point 320(1) are associated with the resolution 322 of 640×360, the target optimizer 230(0) generates an interpolation polynomial P that is associated with the resolution 322 of 640×360.

The target optimizer 230(0) generates the interpolation polynomial P based on the polynomial interpolation algorithm and the 640×360 shot encode points 320 included in the convex hull 350(0). Similarly, because the right shot encode point 320(2) is associated with the resolution 960× 540, the target optimizer 230(0) generates an interpolation polynomial P that is associated with the resolution 322 960×540. The target optimizer 230(0) generates the interpolation polynomial Q based on the polynomial interpolation algorithm and the 960×540 shot encode points 320 included in the convex hull 350(0). In alternate embodiments, the target optimizer 230(0) may generate interpolation polynomials based on any number and different combinations of the shot encode points 320 in any technically feasible fashion.

Since the left shot encode point 320(0) has the same resolution 322 of 640×360 as the optimized shot encode point 320(1), the target optimizer 320(0) generates one additional encoding point 220(6) based on the interpolation polynomial P. As shown, the encoding point 220(6) has the resolution 322(6) of 640×360 and the QP value 324(6) of 42. Notably, encoding point 220(6) resides between the left shot encode point 320(0) and the optimized shot encode point 320(1) along the convex hull 350(0). In general, the target optimizer 320(0) may generate any number of additional encoding points 220 based on any number of interpolation polynomials in any technically feasible fashion.

Since the right shot encode point 320(2) does not have the same resolution 322 as the optimized shot encode point 320(1), the target optimizer 320(0) generates two additional encoding points 220(7) and 220(8). The target optimizer 320(0) generates the additional encoding point 220(7) based on the interpolation polynomial P, and the additional encoding point 220(8) based on the interpolation polynomial Q. As shown, the encoding point 220(7) has the resolution 322(7) of 640×360 and the QP value 324(7) of 16, and the encoding point 220(8) has the resolution 322(8) of 960×540 and the QP value 324(8) of 41.

As previously described in conjunction with FIG. 2A, for each of the shot sequences 132(x), the target optimizer 230(0) generates the encoding list update 240(x) that includes any additional encoding points 220 for the shot sequence 132(x). As part of generating the encoding list update 240(x), the target optimizer 230(0) discards any of the additional encoding points 220 that are already included in the encoding list 210(x) associated with the shot sequence 132(x). If the target optimizer 230(0) does not add any encoding points 220 to any of the encoding list updates 240, then the target optimizer 230(0) sets the target video sequence 180(0) equal to the encoded video sequence 386 included in the optimized video encode point 380. If the iteration controller 140 determines that the target optimizer 230(t) has assigned an encoded video sequence 386 to the target video sequence 180(t), then the iteration controller 140 determines that the target optimizer 230(t) has converged.

In alternate embodiments, the target optimizer 230(t) may determine when to assign the encoded video sequence 386 to the target video sequence 180(t) in any technically feasible fashion. In the same or other embodiments, the iteration controller 140 may determine that the target optimizer 230(t) has converged in any technically feasible fashion. For instance, in some embodiments, the target optimizer 230(t)

may assign the encoded video sequence 386 to the target video sequence 180(*t*) when a total number of iterations is equal to a maximum iterations configuration parameter (e.g., 5 iterations). In other embodiments, the target optimizer 230(*t*) may measure the improvement obtained at each iteration. If the improvement is less than an improvement configuration parameter (e.g., 1%), then the target optimizer 230(*t*) may assign the encoded video sequence 386 to the target video sequence 180(*t*). In yet other embodiments, the iteration controller 140 may track the amount of processor resources consumed by the iterative encoding application 120. If the amount of processor resources is higher than a processor limit configuration parameter, then the iteration controller 140 may set the target video sequences 180(0)-180(N) based on the optimized video encode points 380 identified by the iteration optimizers 230(0)-230(N).

After all of the iteration optimizers 230(0)-230(N) have converged, the iteration controller 140 transmits the target encoded video sequences 180(0)-180(N) to the CDN. The iteration controller 140 may transmit the target encoded video sequences 180 to the CDN 190 in any technically feasible fashion. In alternate embodiments, the iteration controller 140 may periodically transmit N partially optimized encoded video sequences 386 to the CDN 190. The N partially optimized encoded video sequences 386 are the encoded video sequences 386 included in the optimized video encode points 380 identified by the iteration optimizers 230(0)-230(N). In this fashion, the iteration controller 140 enables endpoint devices to display the media title while the iteration controller 140 continues to iterate.

FIG. 8 illustrates exemplary target encoded video sequences 180 that are generated by the iterative encoding application 120 of FIG. 1, according to various embodiments of the present invention. In general, the iterative encoding application 120 optimizes each of the encoded shot sequences 326 included in the target encoded video sequence 180(*t*) based on the target metric value 142(*t*).

The iterative encoding application 120 generates the target encoded video sequence 180(0) based on the target metric value 142(0) of 560 kbps. The target encoded video sequence 180(0) includes, without limitation, the encoded shot sequence 326 derived from a 640×360 version of the shot sequence 132(0) and encoded using the QP value 324 of 26, followed by the encoded shot sequence 326 derived from a 640×360 version of the shot sequence 132(1) and encoded using the QP value 324 of 26, followed by the encoded shot sequence 326 derived from a 640×360 version of the shot sequence 132(2) and encoded using the QP value 324 of 51, etc.

The iterative encoding application 120 generates the target encoded video sequence 180(1) based on the target metric value 142(1) of 3000 kbps. The target encoded video sequence 180(1) includes, without limitation, the encoded shot sequence 326 derived from a 960×540 version of the shot sequence 132(0) and encoded using the QP value 324 of 40, followed by the encoded shot sequence 326 derived from a 640×360 version of the shot sequence 132(1) and encoded using the QP value 324 of 11, followed by the encoded sot sequence 326 derived from a 1280×720 version of the shot sequence 132(2) and encoded using the QP value 324 of 47, etc.

The iterative encoding application 120 generates the target encoded video sequence 180(2) based on the target metric value 142(2) of 5800 kbps. The target encoded video sequence 180(2) includes, without limitation, the encoded shot sequence 326 derived from a 960×540 version of the shot sequence 132(0) and encoded using the QP value 324 of 15, followed by the encoded shot sequence 326 derived from a 640×360 version of the shot sequence 132(1) and encoded using the QP value 324 of 7, followed by the encoded sot sequence 326 derived from a 1280×720 version of the shot sequence 132(2) and encoded using the QP value 324 of 47, etc.

Figure 9A:
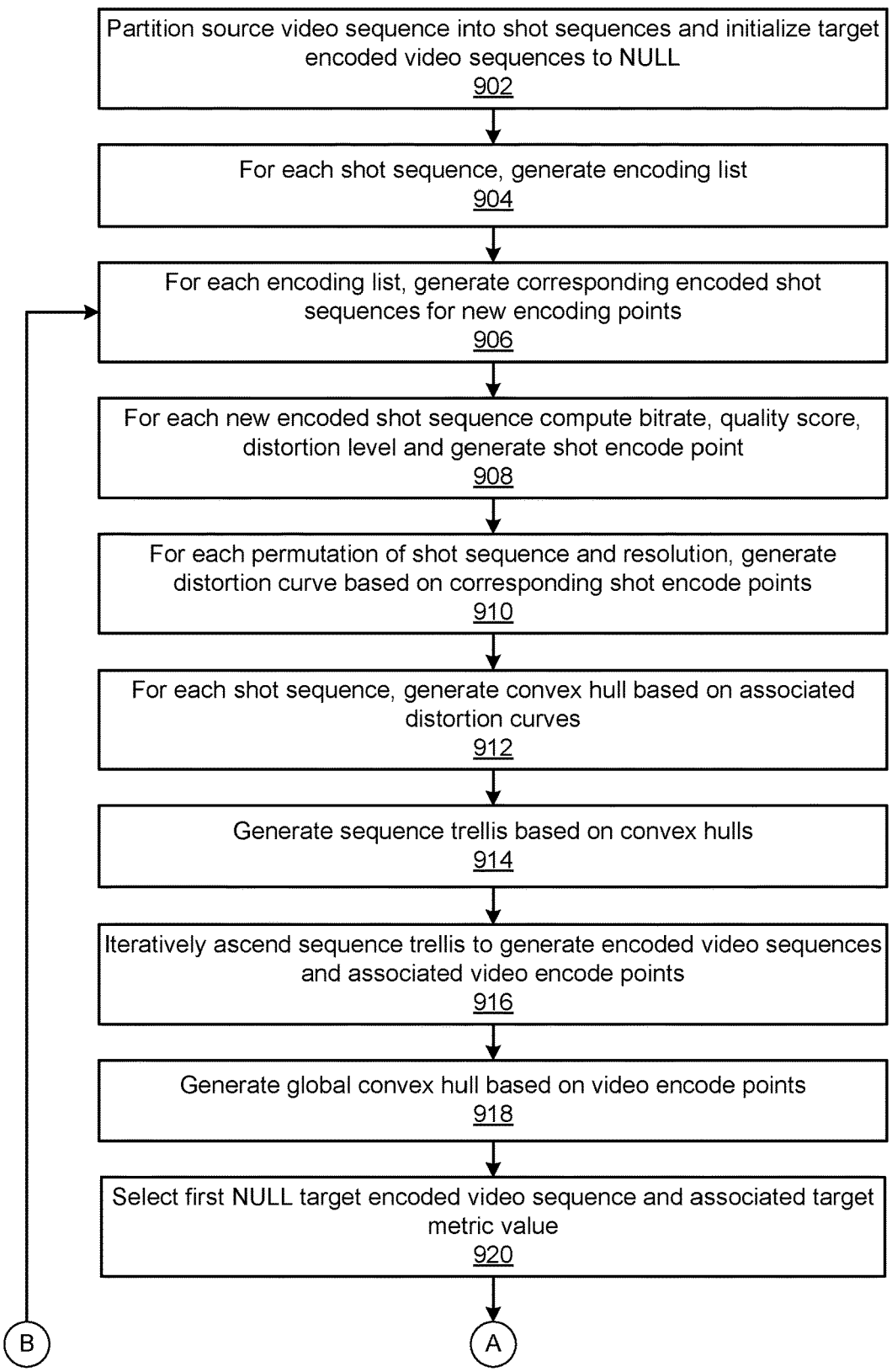
FIGS. 9A-9B set forth a flow diagram of method steps for encoding a media title for streaming, according to various embodiments of the present invention.
Figure 9B:
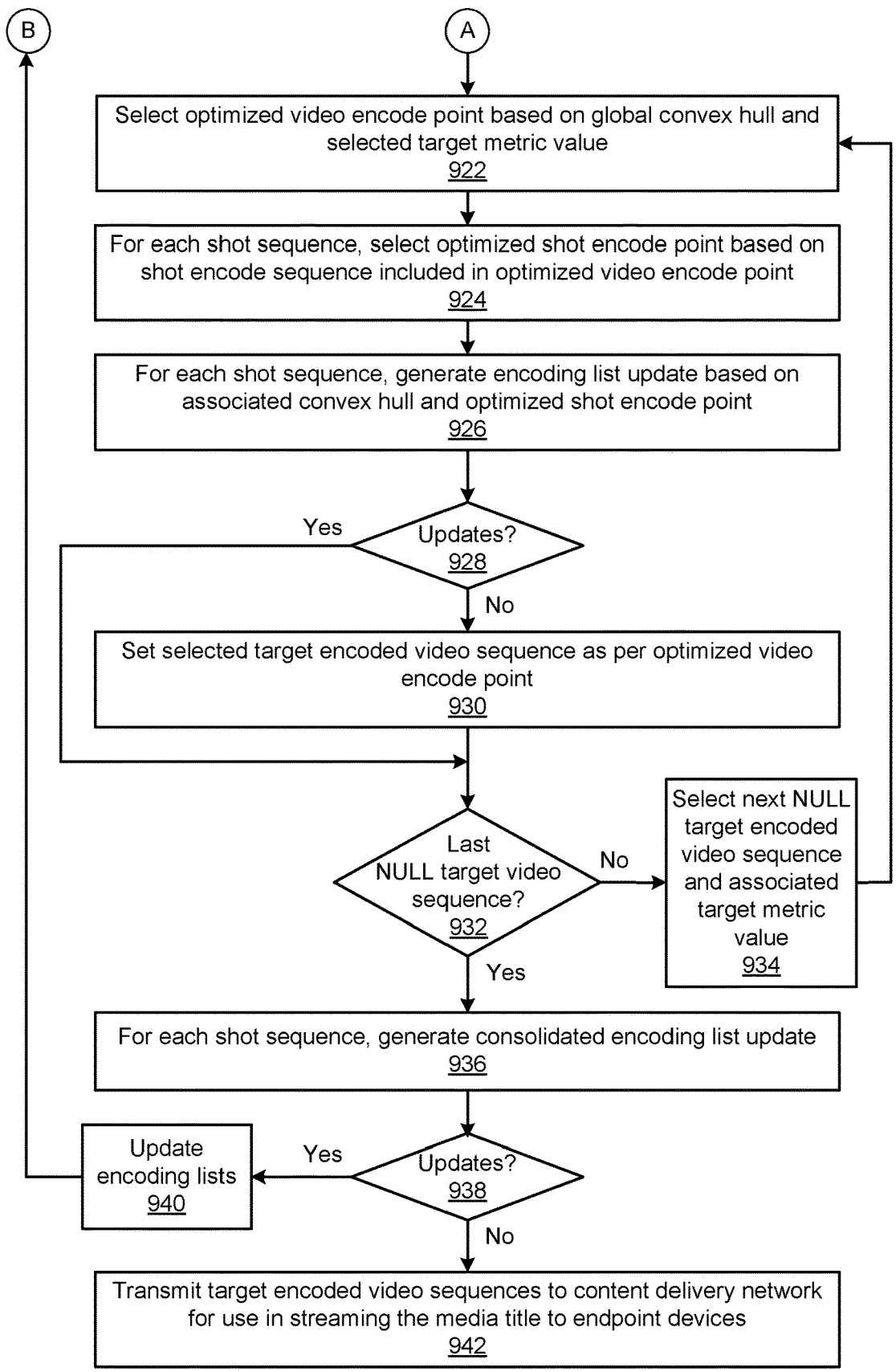

FIGS. 9A-9B set forth a flow diagram of method steps for encoding a media title for streaming, according to various embodiments of the present invention. Although the method steps are described with reference to the systems of FIGS. 1-8, persons skilled in the art will understand that any system configured to implement the method steps, in any order, falls within the scope of the present invention. For instance, in various embodiments, different instances of the target optimizer 230 perform any number and/or portions of the steps 922-934 in parallel.

As shown, a method 900 begins at step 902, where the shot analyzer 130 partitions the source video sequence 122 into the shot sequences 132 and initializes each of the target encoded video sequences 180 to NULL. At step 904, for each of the shot sequences 132, the iteration controller 140 generates the encoding list 210. Each of the encoding points 220 included in the encoding lists 210 includes the resolution 322 and the QP value 324. In alternate embodiments, each of the encoding points 220 may specify any number and type of encoding parameter values instead of or in addition to the QP value 324.

At step 906, for each of the encoding lists 210, the dynamic optimizer 150 identifies the new encoding points 220 and generates the corresponding encoded shot sequences 326. At step 908, for each of the new encoded shot sequences 326, the dynamic optimizer 150 computes the bitrate 332, the quality score 334, and the distortion level 336. Subsequently, the dynamic optimizer 150 generates the new shot encode point 320 that includes, without limitation, the encoded shot sequence 326, the resolution 322, the QP value 324, the bitrate 332, the quality score 334, the distortion level 336.

At step 910, for each permutation of the shot sequence 132 and the resolution 322, the convex hull generator 340 generates the associated distortion curve 450 based on the corresponding shot encode points 320. At step 912, for each of the shot sequences 132(*x*), the convex hull generator 340 generates the convex hull 350(*x*) based on the associated distortion curves 450. At step 914, the trellis iterator 360 generates the sequence trellis 370 based on the convex hulls 350. At step 916, the trellis iterator 360 iteratively ascends the sequence trellis 370 to generate the encoded video sequences 386 and the associated video encode points 380. At step 918, the iteration controller 140 generates the global convex hull 390 based on the video encode points 380.

At step 920, the iteration controller 140 selects the first target encoded video sequence 180(*t*) that is equal to NULL and the associated target metric value 142(*t*). At step 922, the target optimizer 230(*t*) selects the optimized video encode point 380 based on the global convex hull 390 and the selected target metric value 142(*t*). At step 924, for each of the shot sequences 132, the target optimizer 230(*t*) selects the optimized shot encode point 320 based on the shot encode sequence 382 included in the optimal video encode point 380. At step 926, for each of the shot sequences 132(*x*), the target optimizer 230(*t*) generates the encoding list update 240(*x*) associated with the selected target metric value 142(*t*) based on the convex hull 350(*x*) and the optimized shot encode point 320.

At step 928, the target optimizer 230(*t*) determines whether there are any "additional" encoding points 220 included in any of the encoding list updates 240 associated with the selected target metric value 142(*t*). If, at step 928, the target optimizer 230(*t*) determines that there no additional encoding point(s) 220 associated with the selected target metric value 142(*t*), then the method 900 proceeds to step 930. At step 930, the target optimizer 230(*t*) sets the target encoded video sequence 180(*t*) equal to encoded video sequence 386 included in the optimized video encode point 380.

If, at step 928, the target optimizer 230(*t*) determines that there are additional encoding point(s) 220 associated with the selected target metric value 142(*t*), then the method 900 proceeds directly to step 932. At step 932, the iteration controller 140 determines whether the target video sequence 180(*t*) is the last target video sequence 180 that is equal to NULL. If, at step 932, the iteration controller 140 determines that the target video sequence 180(*t*) is not the last target video sequences 180 that is equal to NULL, the then method 900 proceeds to step 934. At step 934, the iteration controller 140 selects the next target video sequences 180(*t*) and the associated target metric value 142(*t*). The method 900 then returns to step 922, where the target optimizer 230(*t*) selects the optimized video encode point 380 based on the new target metric value 142(*t*).

If, however, at step 932, the iteration controller 140 determines that the target video sequence 180(*t*) is the last target video sequences 180 that is equal to NULL, then the method 900 proceeds directly to step 936. At step 936, for each of the shot sequences 132(*x*), the iteration optimizer 250 generates the consolidated encoded list update 252(*x*) based on the different encoding list updates 240(*x*). At step 938, the iteration controller 140 determines whether there are any "additional" encoding points(s) 220 included in any of the consolidated encoding list updates 252.

If, at step 938, the iteration controller 140 determines that there are additional encoding point(s) 220, then the method 900 proceeds to step 940. At step 940, the iteration controller 140 updates the encoding lists 210 based on the consolidated encoding list updates 252. The method 900 then returns to step 906, where the dynamic optimizer 150 identifies the new encoding points 220 and generates the corresponding encoded shot sequences 326.

If, however, at step 938, the iteration controller 140 determines that there are no additional encoding point(s) 220, then the method 900 proceeds directly to step 942. At step 942, the iteration controller 140 transmits the target encoded video sequences 180 to the content delivery network 190 for use in streaming the media title to endpoint devices. The method 900 then terminates.

In sum, the disclosed techniques enable efficient and optimal encoding of source video sequences for streaming to endpoint devices. An iterative encoding application includes, without limitation, a shot analyzer, an iteration controller, and a dynamic optimizer. Initially, the shot analyzer partitions a source video sequence into multiple shot sequences. For each shot sequence, the iteration controller initializes an encoding list to include relatively sparsely distributed encoding points. Each encoding point specifies a resolution and a quantization parameter (QP) value. The iteration controller then configures the dynamic optimizer to generate a global convex hull based on the encoding lists.

First, the dynamic optimizer generates new shot encode points based on the new encoding points included in the encoding lists. A "new" encoding point is an encoding point for which the dynamic optimizer has not previously generated an associated encoded shot sequence. Each shot encode point includes, without limitation, an encoded shot sequence, a resolution, a QP value, a quality score, a distortion level, and a bitrate. Subsequently, for each shot sequence, the dynamic optimizer generates a convex hull that includes a subset of the shot encode points associated with the shot sequence. In general, for a given shot sequence, the shot encode points included in the associated convex hull minimize the bitrate for different distortion levels.

The dynamic optimizer then evaluates the convex hulls across all of the shot sequences to determine shot encode sequences. Each shot encode sequence specifies shot encode points for the different shot sequences. For each shot encode sequence, the dynamic optimizer aggregates the different encoded shot sequences included in the shot encode points to generate an encoded video sequence. For each shot encode sequence, the dynamic optimizer then generates a video encode point that includes the shot encode sequence, the associated encoded video sequence, an overall bitrate for the encoded video sequence, and an overall distortion level for the encoded video sequence. Subsequently, the dynamic optimizer generates a global convex hull based on the video encode points. In general, for the source video sequence, the video encode points included in the global convex hull minimize the overall bitrate for different overall distortion levels.

For each target metric value, a different instance of a target optimizer included in the iterative encoding application independently processes the global convex hull. For a given target metric value, the associated instance of the target optimizer selects the encoded video sequence having a metric value closes to the target metric value. The instance of the target optimizer then determines whether the selected encoded video sequence is optimized for the target metric value. If the instance of the target optimizer determines that the selected encoded video sequence is optimized for the target metric value, then the instance of the target optimizer sets a target encoded video sequence associated with the target metric value equal to the selected encoded video sequence. Otherwise, for each shot sequence, the instance of the target optimizer generates an encoding list update based on the associated target metric value. Each encoding list update includes any number (including zero) of additional shot-specific encoding points.

For each shot sequence, the iteration controller generates a consolidated encoding list update associated with the shot sequence based on the encoding list updates associated with the shot sequence. As part of generating the consolidated encoding list updates, the iteration controller removes any duplicated encoding points. If there are any "new" encoding points included in any of the consolidated encoding list updates, then the iterative encoding application generates new encoded shot sequences based on the new encoding points, re-generates the optimized encoded video sequences, and re-selects encoded video sequences for each non-optimized target metric value.

The iterative encoding application continues to operate in this fashion until each instance of the target optimizer has assigned one of the encoded video sequences to the associated target encoded video sequence. Finally, the iteration controller transmits the target encoded video sequences to a content delivery network for distribution to endpoint devices. Notably, each of the encoded shot sequences included in a given encoded video sequence can be associated with a different encoding point. For example, an encoded video sequence could include a car chase shot sequence that is encoded using a resolution of 1280×720 and a QP value of 1 followed by a monologue shot sequence that is encoded using a resolution of 960×540 and a QP value of 34.

At least one advantage and technological advancement of the iterative encoding application is that aggregating shot sequences encoded using different encoding points to generate the target encoded video sequences reduces the encoding inefficiencies typically associated with conventional encoding techniques. Such encoding inefficiencies not only needlessly waste computational and storage resources, these types of inefficiencies also unnecessarily increase the bandwidth required to stream encoded versions of media titles to endpoint devices. Further, by iteratively evaluating additional, non-duplicated encoding points based on multiple target metric values, the iterative encoding application efficiently converges to multiple target encoded video sequences while reducing redundant computations.

1. In some embodiments, a computer-implemented method comprises generating a first set of shot encode points based on a first set of encoding points and a first shot sequence included in a source media sequence that is associated with a media title; performing convex hull operations across the first set of shot encode points to generate a first convex hull; generating a first plurality of encoded media sequences based on the first convex hull and a second convex hull that is associated with both a second shot sequence included in the source media sequence and a second set of encoding points; determining a first optimized encoded media sequence from the first plurality of encoded media sequences based on a first target metric value for a media metric, wherein at least a portion of the first optimized encoded media sequence is subsequently streamed to a first endpoint device during playback of the media title; and determining a second optimized encoded media sequence from the first plurality of encoded media sequences based on a second target metric value for the media metric, wherein at least a portion of the second optimized encoded media sequence is subsequently streamed to a second endpoint device during playback of the media title.

2. The computer-implemented method of clause 1, further comprising generating a first update list that includes at least a first encoding point that is not included in the first set of encoding points based on the first plurality of encoded media sequences and a third target value for the media metric; adding each encoding point included in the first update list that is not also included in a second update list associated with a fourth target value for the media metric to the second update list to generate a consolidated update list; generating a second plurality of encoded media sequences based on the consolidated update list; and determining a third optimized encoded media sequence from the second plurality of encoded media sequences based on the third target metric value, wherein at least a portion of the third optimized encoded media sequence is subsequently streamed to a third endpoint device during playback of the media title.

3. The computer-implemented method of clauses 1 or 2, wherein performing the convex hull operations comprises determining a region that includes the first set of shot encode points; identifying a boundary of the region, wherein no shot encode points included in the first set of shot encode points are located on a first side of the boundary; and discarding any shot encode points included in the first set of shot encode points that are not located along the boundary to generate the first convex hull.

4. The computer-implemented method of any of clauses 1-3, wherein each shot encode point included in the first set of shot encode points is associated with both a bitrate and a value for either a distortion metric or a visual quality metric.

5. The computer-implemented method of any of clauses 1-4, wherein generating the first plurality of encoded media sequences comprises aggregating a first encoded shot sequence associated with a first shot encode point included in the first convex hull with a second encoded shot sequence associated with a second shot encode point included in the second convex hull to generate a first encoded media sequence included in the first plurality of encoded media sequences.

6. The computer-implemented method of any of clauses 1-5, wherein generating the first plurality of encoded media sequences comprises computing a first slope value between a first shot encode point and a second shot encode point, wherein both the first shot encode point and the second shot encode point are included in the first convex hull; determining a first encoded shot sequence associated with the first shot encode point based on the first slope value; and aggregating the first encoded shot sequence with a second encoded shot sequence to generate a first encoded media sequence included in the first plurality of media sequences, wherein the second encoded shot sequence is associated with a third shot encode point included in the second convex hull.

7. The computer-implemented method of any of clauses 1-6, wherein determining the first optimized encoded media sequence comprises computing a first metric value for the media metric based on a first encoded media sequence included in the first plurality of encoded media sequences; comparing the first metric value to the first target value; and setting the first optimized encoded media sequence equal to the first encoded media sequence.

8. The computer-implemented method of any of clauses 1-7, further comprising generating a global convex hull based on the first plurality of encoded media sequences, wherein the global convex hull includes a first set of media encode points; determining a first media encode point included in the global convex hull based on a third target value for the media metric; computing a first encoding point that is not included in the first of encoding points based on the first media encode point and the first convex hull; and generating a third optimized encoded media sequence associated with the third target metric value based on the first encoding point and the second convex hull, wherein at least a portion of the third optimized encoded media sequence is subsequently streamed to a third endpoint device during playback of the media title.

9. The computer-implemented method of any of clauses 1-8, further comprising: determining a first encoded media sequence included in the first plurality of encoded media sequences based on a third target value for the media metric; determining a first shot encode point that is associated with the first encoded media sequence and is included in the first convex hull; determining a second shot encode point included in the first convex hull based on a distance between the first shot encode point and the second shot encode point; performing at least one arithmetic operation based on the first shot encode point and the second shot encode point to compute a first encoding point that is not included in the first set of encoding points; and generating a third optimized encoded media sequence that is associated with the third target metric value based on the first encoding point and the second convex hull, wherein at least a portion of the third optimized encoded media sequence is subsequently streamed to a third endpoint device during playback of the media title.

10. The computer-implemented method of any of clauses 1-9, wherein performing the at least one arithmetic operation comprises performing one or more polynomial interpolation operations based on a first value for an encoding parameter and a second value for the encoding parameter.

11. In some embodiments, a computer-readable storage medium includes instructions that, when executed by a processor, cause the processor to perform the steps of generating a first set of shot encode points based on a first set of encoding points and a first shot sequence included in a source media sequence that is associated with a media title; performing convex hull operations across the first set of shot encode points to generate a first convex hull; generating a first global convex hull based on the first convex hull and a second convex hull that is associated with that is associated with both a second shot sequence included in the source media sequence and a second set of encoding points; determining a first optimized encoded media sequence based on the first global convex hull and a first target metric value for a media metric, wherein at least a portion of the first optimized encoded media sequence is subsequently streamed to a first endpoint device during playback of the media title; and determining a second optimized encoded media sequence based on the first global convex hull and a second target metric value for the media metric, wherein at least a portion of the second optimized encoded media sequence is subsequently streamed to a second endpoint device during playback of the media title.

12. The computer-readable storage medium of clause 11, further comprising generating a first update list that includes at least a first encoding point that is not included in the first set of encoding points based on the first global convex hull and a third target value for the media metric; adding each encoding point included in the first update list that is not also included in a second update list associated with a fourth target value for the media metric to the second update list to generate a consolidated update list; generating a second global convex hull based on the consolidated update list; and determining a third optimized encoded media sequence based on the second global convex hull and the third target metric value, wherein at least a portion of the third optimized encoded media sequence is subsequently streamed to a third endpoint device during playback of the media title.

13. The computer-readable storage medium of clauses 11 or 12, wherein generating the first global convex hull comprises computing a first slope value between a first shot encode point and a second shot encode point, wherein both the first shot encode point and the second shot encode point are included in the first convex hull; determining a first encoded shot sequence associated with the first shot encode point based on the first slope value; aggregating the first encoded shot sequence with a second encoded shot sequence to generate a first encoded media sequence, wherein the second encoded shot sequence is associated with a third shot encode point included in the second convex hull; generating a first media encode point based on the first encoded media sequence; and adding the first media encode point to a partial global convex hull to generate the global convex hull.

14. The computer-readable storage medium of any of clauses 11-13, further comprising determining a first media encode point included in the first global convex hull based on a third target value for the media metric; determining a first shot encode point included in the first convex hull based on the first media encode point; determining a second shot encode point included in the first convex hull based on a distance between the first shot encode point and the second shot encode point; performing at least one arithmetic operation based on the first shot encode point and the second shot encode point to compute a first encoding point that is not included in the first set of encoding points; and generating a third optimized encoded media sequence that is associated with the third target metric value based on the first encoding point and the second convex hull, wherein at least a portion of the third optimized encoded media sequence is subsequently streamed to a third endpoint device during playback of the media title.

15. The computer-readable storage medium of any of clauses 11-14, wherein performing the at least one arithmetic operation comprises performing one or more polynomial interpolation operations based on a first value for an encoding parameter and a second value for the encoding parameter.

16. The computer-readable storage medium of any of clauses 11-15, wherein a first resolution associated with the first shot encode point is not equal to a second resolution associated with the second shot encode point.

17. The computer-readable storage medium of any of clauses 11-16, wherein the media metric comprises a bitrate, a peak signal-to-noise-ratio (PSNR), a linear media multi-method assessment fusion (VMAF) metric, a harmonic VMAF (VMAFh) metric, or a distortion metric.

18. The computer-readable storage medium of any of clauses 11-17, wherein a first encoding point included in the first set of encoding points specifies at least one of a resolution and an encoding parameter.

19. The computer-readable storage medium of any of clauses 11-18, wherein the source media sequence comprises at least one of video content and audio content.

20. In some embodiments a system comprises a memory storing instructions; and a processor that is coupled to the memory and, when executing the instructions, is configured to partition a source media sequence that is associated with a media title into a plurality of frame sets that includes a first frame set and a second frame set; generate a first set of shot encode points based on a first set of encoding points and the first frame set; perform convex hull operations across the first set of shot encode points to generate a first convex hull; generate a first plurality of encoded media sequences based on the first convex hull and a second convex hull that is associated with both the second frame set and a second set of encoding points; determine a first optimized encoded media sequence from the first plurality of encoded media sequences based on a first target metric value for a media metric, wherein at least a portion of the first optimized encoded media sequence is subsequently streamed to a first endpoint device during playback of the media title; and determine a second optimized encoded media sequence from the first plurality of encoded media sequences based on a second target metric value for the media metric, wherein at least a portion of the second optimized encoded media sequence is subsequently streamed to a second endpoint device during playback of the media title.

Any and all combinations of any of the claim elements recited in any of the claims and/or any elements described in this application, in any fashion, fall within the contemplated scope of the present invention and protection The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
    generating a first set of shot encode points based on a first set of encoding points and a first shot sequence included in a source media sequence that is associated with a media title;
    performing convex hull operations across the first set of shot encode points to generate a first convex hull;
    generating a first plurality of encoded media sequences based on the first convex hull and a second convex hull that is associated with both a second shot sequence included in the source media sequence and a second set of encoding points;
    determining a first optimized encoded media sequence from the first plurality of encoded media sequences based on a first target metric value for a media metric, wherein at least a portion of the first optimized encoded media sequence is subsequently streamed to a first endpoint device during playback of the media title; and
    determining a second optimized encoded media sequence from the first plurality of encoded media sequences based on a second target metric value for the media metric, wherein at least a portion of the second optimized encoded media sequence is subsequently streamed to a second endpoint device during playback of the media title.

2. The computer-implemented method of claim 1, further comprising:
    generating a first update list that includes at least a first encoding point that is not included in the first set of encoding points based on the first plurality of encoded media sequences and a third target value for the media metric;
    adding each encoding point included in the first update list that is not also included in a second update list associated with a fourth target value for the media metric to the second update list to generate a consolidated update list;
    generating a second plurality of encoded media sequences based on the consolidated update list; and
    determining a third optimized encoded media sequence from the second plurality of encoded media sequences based on the third target metric value, wherein at least a portion of the third optimized encoded media sequence is subsequently streamed to a third endpoint device during playback of the media title.

3. The computer-implemented method of claim 1, wherein performing the convex hull operations comprises:
    determining a region that includes the first set of shot encode points;
    identifying a boundary of the region, wherein no shot encode points included in the first set of shot encode points are located on a first side of the boundary; and
    discarding any shot encode points included in the first set of shot encode points that are not located along the boundary to generate the first convex hull.

4. The computer-implemented method of claim 1, wherein each shot encode point included in the first set of shot encode points is associated with both a bitrate and a value for either a distortion metric or a visual quality metric.

5. The computer-implemented method of claim 1, wherein generating the first plurality of encoded media sequences comprises aggregating a first encoded shot sequence associated with a first shot encode point included in the first convex hull with a second encoded shot sequence associated with a second shot encode point included in the second convex hull to generate a first encoded media sequence included in the first plurality of encoded media sequences.

6. The computer-implemented method of claim 1, wherein generating the first plurality of encoded media sequences comprises:
   computing a first slope value between a first shot encode point and a second shot encode point, wherein both the first shot encode point and the second shot encode point are included in the first convex hull;
   determining a first encoded shot sequence associated with the first shot encode point based on the first slope value; and
   aggregating the first encoded shot sequence with a second encoded shot sequence to generate a first encoded media sequence included in the first plurality of media sequences, wherein the second encoded shot sequence is associated with a third shot encode point included in the second convex hull.

7. The computer-implemented method of claim 1, wherein determining the first optimized encoded media sequence comprises:
   computing a first metric value for the media metric based on a first encoded media sequence included in the first plurality of encoded media sequences;
   comparing the first metric value to the first target value; and
   setting the first optimized encoded media sequence equal to the first encoded media sequence.

8. The computer-implemented method of claim 1, further comprising:
   generating a global convex hull based on the first plurality of encoded media sequences, wherein the global convex hull includes a first set of media encode points;
   determining a first media encode point included in the global convex hull based on a third target value for the media metric;
   computing a first encoding point that is not included in the first of encoding points based on the first media encode point and the first convex hull; and
   generating a third optimized encoded media sequence associated with the third target metric value based on the first encoding point and the second convex hull, wherein at least a portion of the third optimized encoded media sequence is subsequently streamed to a third endpoint device during playback of the media title.

9. The computer-implemented method of claim 1, further comprising:
   determining a first encoded media sequence included in the first plurality of encoded media sequences based on a third target value for the media metric;
   determining a first shot encode point that is associated with the first encoded media sequence and is included in the first convex hull;
   determining a second shot encode point included in the first convex hull based on a distance between the first shot encode point and the second shot encode point;
   performing at least one arithmetic operation based on the first shot encode point and the second shot encode point to compute a first encoding point that is not included in the first set of encoding points; and
   generating a third optimized encoded media sequence that is associated with the third target metric value based on the first encoding point and the second convex hull, wherein at least a portion of the third optimized encoded media sequence is subsequently streamed to a third endpoint device during playback of the media title.

10. The computer-implemented method of claim 9, wherein performing the at least one arithmetic operation comprises performing one or more polynomial interpolation operations based on a first value for an encoding parameter and a second value for the encoding parameter.

11. A computer-readable storage medium including instructions that, when executed by a processor, cause the processor to perform the steps of:
   generating a first set of shot encode points based on a first set of encoding points and a first shot sequence included in a source media sequence that is associated with a media title;
   performing convex hull operations across the first set of shot encode points to generate a first convex hull;
   generating a first global convex hull based on the first convex hull and a second convex hull that is associated with that is associated with both a second shot sequence included in the source media sequence and a second set of encoding points;
   determining a first optimized encoded media sequence based on the first global convex hull and a first target metric value for a media metric, wherein at least a portion of the first optimized encoded media sequence is subsequently streamed to a first endpoint device during playback of the media title; and
   determining a second optimized encoded media sequence based on the first global convex hull and a second target metric value for the media metric, wherein at least a portion of the second optimized encoded media sequence is subsequently streamed to a second endpoint device during playback of the media title.

12. The computer-readable storage medium of claim 11, further comprising:
   generating a first update list that includes at least a first encoding point that is not included in the first set of encoding points based on the first global convex hull and a third target value for the media metric;
   adding each encoding point included in the first update list that is not also included in a second update list associated with a fourth target value for the media metric to the second update list to generate a consolidated update list;
   generating a second global convex hull based on the consolidated update list; and
   determining a third optimized encoded media sequence based on the second global convex hull and the third target metric value, wherein at least a portion of the third optimized encoded media sequence is subsequently streamed to a third endpoint device during playback of the media title.

13. The computer-readable storage medium of claim 11, wherein generating the first global convex hull comprises:
   computing a first slope value between a first shot encode point and a second shot encode point, wherein both the first shot encode point and the second shot encode point are included in the first convex hull;

determining a first encoded shot sequence associated with the first shot encode point based on the first slope value;

aggregating the first encoded shot sequence with a second encoded shot sequence to generate a first encoded media sequence, wherein the second encoded shot sequence is associated with a third shot encode point included in the second convex hull;

generating a first media encode point based on the first encoded media sequence; and adding the first media encode point to a partial global convex hull to generate the global convex hull.

14. The computer-readable storage medium of claim 11, further comprising:

determining a first media encode point included in the first global convex hull based on a third target value for the media metric;

determining a first shot encode point included in the first convex hull based on the first media encode point;

determining a second shot encode point included in the first convex hull based on a distance between the first shot encode point and the second shot encode point;

performing at least one arithmetic operation based on the first shot encode point and the second shot encode point to compute a first encoding point that is not included in the first set of encoding points; and generating a third optimized encoded media sequence that is associated with the third target metric value based on the first encoding point and the second convex hull, wherein at least a portion of the third optimized encoded media sequence is subsequently streamed to a third endpoint device during playback of the media title.

15. The computer-readable storage medium of claim 14, wherein performing the at least one arithmetic operation comprises performing one or more polynomial interpolation operations based on a first value for an encoding parameter and a second value for the encoding parameter.

16. The computer-readable storage medium of claim 14, wherein a first resolution associated with the first shot encode point is not equal to a second resolution associated with the second shot encode point.

17. The computer-readable storage medium of claim 11, wherein the media metric comprises a bitrate, a peak signal-to-noise-ratio (PSNR), a linear media multimethod assessment fusion (VMAF) metric, a harmonic VMAF (VMAFh) metric, or a distortion metric.

18. The computer-readable storage medium of claim 11, wherein a first encoding point included in the first set of encoding points specifies at least one of a resolution and an encoding parameter.

19. The computer-readable storage medium of claim 11, wherein the source media sequence comprises at least one of video content and audio content.

20. A system, comprising:
a memory storing instructions; and
a processor that is coupled to the memory and, when executing the instructions, is configured to:

partition a source media sequence that is associated with a media title into a plurality of frame sets that includes a first frame set and a second frame set;

generate a first set of shot encode points based on a first set of encoding points and the first frame set;

perform convex hull operations across the first set of shot encode points to generate a first convex hull;

generate a first plurality of encoded media sequences based on the first convex hull and a second convex hull that is associated with both the second frame set and a second set of encoding points;

determine a first optimized encoded media sequence from the first plurality of encoded media sequences based on a first target metric value for a media metric, wherein at least a portion of the first optimized encoded media sequence is subsequently streamed to a first endpoint device during playback of the media title; and determine a second optimized encoded media sequence from the first plurality of encoded media sequences based on a second target metric value for the media metric, wherein at least a portion of the second optimized encoded media sequence is subsequently streamed to a second endpoint device during playback of the media title.

* * * * *